United States Patent
Li et al.

(10) Patent No.: US 11,490,375 B2
(45) Date of Patent: Nov. 1, 2022

(54) DOWNLINK CONTROL CHANNEL TRANSMISSION METHOD AND APPARATUS

(71) Applicant: Huawei Technologies Co., Ltd., Shenzhen (CN)

(72) Inventors: Xueru Li, Beijing (CN); Bingyu Qu, Beijing (CN); Kunpeng Liu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/368,462

(22) Filed: Mar. 28, 2019

(65) Prior Publication Data

US 2019/0223168 A1 Jul. 18, 2019

Related U.S. Application Data

(63) Continuation of application No. PCT/CN2017/103386, filed on Sep. 26, 2017.

(30) Foreign Application Priority Data

Sep. 29, 2016 (CN) .......................... 201610867069.3

(51) Int. Cl.
 *H04W 72/04* (2009.01)
 *H04W 24/08* (2009.01)

(52) U.S. Cl.
 CPC ......... *H04W 72/042* (2013.01); *H04W 24/08* (2013.01)

(58) Field of Classification Search
 CPC .. H04W 72/042; H04W 24/08; H04W 72/044
 See application file for complete search history.

(56) References Cited

U.S. PATENT DOCUMENTS 8,718,662 B2  5/2014  Shan et al.
9,271,272 B2* 2/2016  Awad .................. H04W 72/046
(Continued)

FOREIGN PATENT DOCUMENTS

CN  101594672 A  12/2009
CN  102186251 A   9/2011
(Continued)

OTHER PUBLICATIONS

"On the Structure and Usage Scenarios of ePDCCH," 3GPP TSG RAN WG1 Meeting #67, San Francisco, USA, R1-114300, pp. 1-9, 3rd Generation Partnership, Project, Valbonne, France (Nov. 14-18, 2011).

(Continued)

*Primary Examiner* — Jael M Ulysse
(74) *Attorney, Agent, or Firm* — Leydig, Voit & Mayer, Ltd.

(57) ABSTRACT

A downlink control channel transmission method, a receiving network element, and a sending network element are provided, to improve accuracy of beam measurement. A receiving network element obtains target downlink control information (DCI) on a first target control channel candidate in a target control channel candidate set, where the target DCI is DCI of the receiving network element, and the first target control channel candidate includes one or more control channel element groups (CCEGs); the receiving network element determines, based on the target DCI, a quantity of measurement reference signals and a time-frequency resource corresponding to each measurement reference signal; the receiving network element measures each measurement reference signal, to obtain channel quality information corresponding to each measurement reference signal; and the receiving network element reports the channel quality (Continued)

information corresponding to each measurement reference signal to a sending network element.

14 Claims, 7 Drawing Sheets

(56) References Cited

U.S. PATENT DOCUMENTS

| | | | | |
|---|---|---|---|---|
| 2010/0279628 A1* | 11/2010 | Love | H04L 5/0091 | 455/70 |
| 2011/0249633 A1* | 10/2011 | Hong | H04W 72/042 | 370/328 |
| 2012/0176884 A1* | 7/2012 | Zhang | H04B 7/024 | 370/329 |
| 2012/0207126 A1* | 8/2012 | Qu | H04L 5/0055 | 370/329 |
| 2012/0275398 A1* | 11/2012 | Chen | H04W 24/10 | 370/329 |
| 2012/0282936 A1* | 11/2012 | Gao | H04L 5/0053 | 455/450 |
| 2013/0039284 A1* | 2/2013 | Marinier | H04L 5/001 | 370/329 |
| 2013/0039291 A1* | 2/2013 | Blankenship | H04W 72/042 | 370/329 |
| 2013/0044664 A1* | 2/2013 | Nory | H04L 1/0045 | 370/336 |
| 2013/0044727 A1* | 2/2013 | Nory | H04L 5/0053 | 370/330 |
| 2013/0188558 A1* | 7/2013 | Nam | H04W 24/02 | 370/328 |
| 2013/0188577 A1* | 7/2013 | Papasakellariou | H04L 5/0053 | 370/329 |
| 2013/0195068 A1* | 8/2013 | Baker | H04L 5/0051 | 370/330 |
| 2013/0242853 A1* | 9/2013 | Seo | H04W 72/042 | 370/315 |
| 2013/0286918 A1 | 10/2013 | Park et al. | | |
| 2013/0286980 A1* | 10/2013 | Liao | H04W 72/042 | 370/329 |
| 2013/0301434 A1* | 11/2013 | Krishnamurthy | H04B 7/0617 | 370/252 |
| 2013/0303178 A1* | 11/2013 | Jitsukawa | H04W 72/0406 | 455/450 |
| 2014/0071952 A1* | 3/2014 | Kim | H04L 5/0053 | 370/335 |
| 2014/0086184 A1* | 3/2014 | Guan | H04L 5/0053 | 370/329 |
| 2014/0169321 A1* | 6/2014 | Imamura | H04L 5/0035 | 370/329 |
| 2014/0198720 A1* | 7/2014 | Gaal | H04W 72/04 | 370/328 |
| 2014/0226551 A1* | 8/2014 | Ouchi | H04W 52/40 | 370/311 |
| 2014/0233474 A1* | 8/2014 | Wu | H04L 5/0048 | 370/329 |
| 2014/0314018 A1* | 10/2014 | Gao | H04L 5/0051 | 370/329 |
| 2014/0321399 A1* | 10/2014 | Liu | H04L 5/0048 | 370/329 |
| 2014/0341143 A1* | 11/2014 | Yang | H04L 5/001 | 370/329 |
| 2014/0341145 A1* | 11/2014 | Nakashima | H04L 1/1607 | 370/329 |
| 2014/0341146 A1* | 11/2014 | Nakashima | H04W 72/042 | 370/329 |
| 2014/0376479 A1* | 12/2014 | Imamura | H04L 5/0053 | 370/329 |
| 2015/0009937 A1* | 1/2015 | Li | H04L 5/0053 | 370/329 |
| 2015/0023266 A1* | 1/2015 | Imamura | H04L 5/0051 | 370/329 |
| 2015/0029966 A1* | 1/2015 | Park | H04L 5/005 | 370/329 |
| 2015/0036556 A1* | 2/2015 | Imamura | H04W 72/042 | 370/277 |
| 2015/0063281 A1* | 3/2015 | Xu | H04W 72/0446 | 370/329 |
| 2015/0208390 A1* | 7/2015 | Zhao | H04W 72/042 | 370/330 |
| 2015/0230211 A1* | 8/2015 | You | H04W 72/04 | 370/330 |
| 2015/0245322 A1* | 8/2015 | Shimezawa | H04L 5/005 | 370/329 |
| 2015/0295689 A1* | 10/2015 | Lee | H04L 5/0053 | 370/329 |
| 2015/0365925 A1 | 12/2015 | Fu et al. | | |
| 2016/0028521 A1* | 1/2016 | Shimezawa | H04B 7/0632 | 370/329 |
| 2016/0094287 A1 | 3/2016 | Kim et al. | | |
| 2016/0192333 A1* | 6/2016 | Wang | H04W 72/042 | 370/329 |
| 2018/0019843 A1* | 1/2018 | Papasakellariou | H04L 1/1861 | |
| 2018/0205523 A1* | 7/2018 | Imamura | H04W 72/042 | |

FOREIGN PATENT DOCUMENTS

| | | |
|---|---|---|
| CN | 103238363 A | 8/2013 |
| CN | 103973391 A | 8/2014 |
| JP | 2013157698 A | 8/2013 |
| KR | 20130132603 A | 12/2013 |
| WO | 2012146095 A1 | 11/2012 |
| WO | 2016095984 A1 | 6/2016 |

OTHER PUBLICATIONS

CN/201610867069.3, Office Action/Search Report, dated Mar. 29, 2021.

* cited by examiner

DOWNLINK CONTROL CHANNEL TRANSMISSION METHOD AND APPARATUS

CROSS-REFERENCE TO RELATED APPLICATIONS

This application is a continuation of International Application No. PCT/CN2017/103386, filed on Sep. 26, 2017, which claims priority to Chinese Patent Application No. 201610867069.3, filed on Sep. 29, 2016. The disclosures of the aforementioned applications are hereby incorporated by reference in their entireties.

TECHNICAL FIELD

Embodiments of this application relate to the communications field, and in particular, to a downlink control channel transmission method, a receiving network element, and a sending network element.

BACKGROUND

A concept of beam is introduced in a new generation of wireless communications systems. Transmission of downlink control channels may use the concept of beam to further improve transmission reliability. A beam is to concentrate transmit energy in a relatively narrow spatial range or a direction by using one or more antennas, to improve signal receiving energy of a user in the spatial range or the direction, and further enhance data transmission reliability in the spatial range or the direction. To increase a spatial coverage area of a downlink control channel, a base station may use one or more beams to send the downlink control channel. In a coordinated multipoint (CoMP) system, a plurality of base stations may separately use one or more beams to jointly send a downlink control channel, so as to increase a spatial coverage area or improve transmission quality in a coverage area. Channel quality in each beam direction may be measured and fed back by the user, to help beam direction selection for next control channel transmission.

In the prior art, a cell-specific reference signal of a downlink control channel is used to perform channel estimation on a control channel and demodulate downlink control information (DCI) carried on the control channel.

However, when a user cannot demodulate DCI over a beam, the user cannot know whether the demodulation failure is caused by relatively poor quality of the beam. Therefore, beam quality cannot be effectively measured and fed back in the prior art, resulting in relatively low measurement accuracy.

SUMMARY

Embodiments of the present invention provide a downlink control channel transmission method, a receiving network element, and a sending network element, to improve accuracy of beam measurement.

In view of this, a first aspect of the embodiments of the present invention provides a downlink control channel transmission method, including:

obtaining, by a receiving network element, target DCI on a first target control channel candidate in a target control channel candidate set, where the target DCI is DCI of the receiving network element, the first target control channel candidate includes one or more CCEGs, and the target DCI is carried in the one or more CCEGs of the target control channel; parsing, by the receiving network element, content in the target DCI after obtaining the target DCI, and determining a quantity of target measurement reference signals and a time-frequency resource corresponding to each measurement reference signal; after learning of the quantity of target measurement reference signals, measuring, by the receiving network element, each measurement reference signal based on the time-frequency resource corresponding to each measurement reference signal, to obtain channel quality information corresponding to each measurement reference signal; and reporting the channel quality information to a sending network element, where the measurement reference signal includes a demodulation reference signal of the first target control channel candidate and/or a demodulation reference signal of at least one second target control channel candidate in the target control channel candidate set, and the second target control channel candidate is different from the first target control channel candidate.

In the embodiments of the present invention, the sending network element may determine a quantity of CCEGs included in a control channel candidate, a quantity of CCEs included in each CCEG, a quantity of measurement reference signals, and a time-frequency resource corresponding to each measurement reference signal, and add DCI to one or more CCEGs included in the control channel candidate, where the DCI includes the quantity of measurement reference signals. After the receiving network element obtains the DCI through blind detection and learns, based on the DCI, of the quantity of measurement reference signals and the time-frequency resource corresponding to each measurement reference signal, the receiving network element may calculate channel quality information corresponding to each measurement reference signal and report the channel quality information to the sending network element, so that the sending network element can determine channel quality information corresponding to all measurement reference signals. This improves measurement accuracy.

With reference to the first aspect of the embodiments of the present invention, in a first implementation of the first aspect of the embodiments of the present invention, the target control channel candidate set includes at least two control channel candidates, at least two of these control channel candidates have different quantities of CCEGs, and a CCEG set of one of the at least two control channel candidates includes a CCEG of another of the at least two control channel candidates.

With reference to the first aspect of the embodiments of the present invention, in a second implementation of the first aspect of the embodiments of the present invention, the receiving network element may determine, in the following manner, the time-frequency resource corresponding to each measurement reference signal:

determining a demodulation reference signal of one or more CCEGs corresponding to each measurement reference signal, where it should be noted that the one or more CCEGs are in the first target control channel candidate and/or the at least one second target control channel candidate in the target control channel candidate set.

The embodiments of the present invention provide a manner of determining, by the receiving network element, the time-frequency resource corresponding to each measurement reference signal, thereby improving implementability of the solution.

With reference to the second implementation of the first aspect of the embodiments of the present invention, in a third implementation of the first aspect of the embodiments of the present invention, the determining, by the receiving network element, a demodulation reference signal of one or more CCEGs corresponding to each measurement reference signal may be implemented in the following manner:

determining, by the receiving network element, a CCEG included in the first target control channel candidate; and after a quantity of CCEGs in the first target control channel candidate and a quantity of CCEs included in each CCEG are determined, determining, based on the quantity of CCEGs, the quantity of CCEs, and the quantity of measurement reference signals, the demodulation reference signal corresponding to each measurement reference signal.

The embodiments of the present invention provide a specific manner of determining, by the receiving network element, the demodulation reference signal of the one or more CCEGs corresponding to each measurement reference signal, thereby improving implementability of the solution.

A second aspect of the embodiments of the present invention provides another downlink control channel transmission method, where the method includes:

determining, by a sending network element, one or more control channel element groups CCEGs of a first target control channel candidate in a target control channel candidate set, where each CCEG includes one or more CCEs; determining target downlink control information DCI carried on the first target control channel candidate; and sending the target DCI by using the one or more CCEGs of the first target control channel candidate, where the target DCI includes information about a quantity of measurement reference signals and information about a time-frequency resource corresponding to each measurement reference signal, and the measurement reference signal includes a demodulation reference signal of the first target control channel candidate and/or a demodulation reference signal of at least one second target control channel candidate in the target control channel candidate set.

In the embodiments of the present invention, the sending network element may determine a quantity of CCEGs included in a control channel candidate, a quantity of CCEs included in each CCEG, a quantity of measurement reference signals, and a time-frequency resource corresponding to each measurement reference signal, and add DCI to one or more CCEGs included in the control channel candidate, where the DCI includes the quantity of measurement reference signals. After a receiving network element obtains the DCI through blind detection and learns, based on the DCI, of the quantity of measurement reference signals and the time-frequency resource corresponding to each measurement reference signal, the receiving network element may calculate channel quality information corresponding to each measurement reference signal and report the channel quality information to the sending network element, so that the sending network element can determine channel quality information corresponding to all measurement reference signals. This improves measurement accuracy.

With reference to the second aspect of the embodiments of the present invention, in a first implementation of the second aspect of the present invention, the information about the time-frequency resource corresponding to each measurement reference signal includes a demodulation reference signal of one or more CCEGs corresponding to each measurement reference signal.

The embodiments of the present invention provide a specific implementation of determining, by the sending network element, the time-frequency resource corresponding to each measurement reference signal, thereby improving implementability of the solution.

With reference to the second aspect of the embodiments of the present invention, in a second implementation of the second aspect of the present invention, each measurement reference signal is corresponding to a different precoding matrix.

In the embodiments of the present invention, each measurement reference signal is corresponding to a different precoding matrix, and after obtaining the channel quality information corresponding to each measurement reference signal that is reported by the receiving network element, the sending network element may select, based on the information, a proper precoding matrix corresponding to a measurement reference signal to perform next transmission, to improve transmission quality.

With reference to the second aspect of the embodiments of the present invention, in a third implementation of the second aspect of the present invention, a CCEG corresponding to at least one of the measurement reference signals includes at least the CCEG of the first target control channel candidate.

With reference to any one of the second aspect of the embodiments of the present invention, or the first to the third implementations of the second aspect, in a fourth implementation of the second aspect of the present invention, the sending, by the sending network element, the target DCI over the one or more CCEGs of the first target control channel candidate may be implemented in the following manner:

determining, by the sending network element, a modulation and coding scheme corresponding to each CCEG of the first target control channel candidate; modulating and coding, by the sending network element by using the modulation and coding scheme, target DCI carried in each CCEG; and sending, by the sending network element, the modulated and coded target DCI by using a corresponding CCEG.

The embodiments of the present invention provide a specific manner of sending the target DCI by the sending network element, thereby improving implementability of the solution.

A third aspect of the embodiments of the present invention provides a receiving network element, where the receiving network element includes:

an obtaining module, configured to obtain target downlink control information DCI on a first target control channel candidate in a target control channel candidate set, where the target DCI is DCI of the receiving network element, and the first target control channel candidate includes one or more control channel element groups CCEGs;

a determining module, configured to determine, based on the target DCI, a quantity of measurement reference signals and a time-frequency resource corresponding to each measurement reference signal, where the measurement reference signal includes a demodulation reference signal of the first target control channel candidate and/or a demodulation reference signal of at least one second target control channel candidate in the target control channel candidate set;

a measurement module, configured to measure each measurement reference signal, to obtain channel quality information corresponding to each measurement reference signal; and a reporting module, configured to report the channel quality information corresponding to each measurement reference signal to a sending network element.

With reference to the third aspect of the embodiments of the present invention, in a first implementation of the third aspect of the embodiments of the present invention, the target control channel candidate set includes at least two control channel candidates, the at least two control channel candidates have different quantities of CCEGs, and a CCEG set of one of the at least two control channel candidates includes a CCEG of another of the at least two control channel candidates.

With reference to the third aspect of the embodiments of the present invention, in a second implementation of the third aspect of the embodiments of the present invention, the determining module includes:

a determining unit, configured to determine a demodulation reference signal of one or more CCEGs corresponding to each measurement reference signal.

With reference to the second implementation of the third aspect of the embodiments of the present invention, in a third implementation of the third aspect of the embodiments of the present invention, the determining unit includes:

a first determining subunit, configured to determine a CCEG included in the first target control channel candidate; and a second determining subunit, configured to determine, based on the CCEG included in the first target control channel candidate and the quantity of measurement reference signals, the demodulation reference signal of the one or more CCEGs corresponding to each measurement reference signal.

A fourth aspect of the embodiments of the present invention provides a sending network element, where the sending network element includes:

a first determining module, configured to determine one or more control channel element groups CCEGs of a first target control channel candidate in a target control channel candidate set, where each CCEG includes one or more CCEs;

a second determining module, configured to determine target downlink control information DCI carried on the first target control channel candidate, where the target DCI includes information about a quantity of measurement reference signals and information about a time-frequency resource corresponding to each measurement reference signal, and the measurement reference signal includes a demodulation reference signal of the first target control channel candidate and/or a demodulation reference signal of at least one second target control channel candidate in the target control channel candidate set; and a sending module, configured to send the target DCI by using the one or more CCEGs of the first target control channel candidate.

With reference to the fourth aspect of the embodiments of the present invention, in a first implementation of the fourth aspect of the present invention, the information about the time-frequency resource corresponding to each measurement reference signal includes a demodulation reference signal of one or more CCEGs corresponding to each measurement reference signal.

With reference to the fourth aspect of the embodiments of the present invention, in a second implementation of the fourth aspect of the present invention, each measurement reference signal is corresponding to a different precoding matrix.

With reference to the fourth aspect of the embodiments of the present invention, in a third implementation of the fourth aspect of the present invention, a CCEG corresponding to at least one of the measurement reference signals includes at least the CCEG of the first target control channel candidate.

With reference to any one of the fourth aspect of the embodiments of the present invention, and the first to the third implementations of the fourth aspect, in a fourth implementation of the fourth aspect of the present invention, the sending module includes:

a first determining unit, configured to determine a modulation and coding scheme corresponding to each CCEG of the first target control channel candidate;

a second determining unit, configured to modulate and code, by using the modulation and coding scheme, target DCI carried in each CCEG; and a sending unit, configured to send the modulated and coded target DCI by using a corresponding CCEG.

A fifth aspect of the embodiments of the present invention provides a terminal, where the terminal includes a memory, a processor, a transceiver, and a bus system, where the memory is configured to store a program; and the processor is configured to execute the program in the memory to specifically perform the following steps:

obtaining target DCI on a first target control channel candidate in a target control channel candidate set, where the target DCI is DCI of the terminal, the first target control channel candidate includes one or more CCEGs, and the target DCI is carried in the one or more CCEGs of the target control channel; parsing content in the target DCI after obtaining the target DCI, and determining a quantity of target measurement reference signals and a time-frequency resource corresponding to each measurement reference signal; measuring each measurement reference signal, to obtain channel quality information corresponding to each measurement reference signal; and reporting the channel quality information to a sending network element, where the measurement reference signal includes a demodulation reference signal of the first target control channel candidate and/or a demodulation reference signal of at least one second target control channel candidate in the target control channel candidate set, and the second target control channel candidate is different from the first target control channel candidate.

With reference to the fifth aspect of the embodiments of the present invention, in a first implementation of the fifth aspect of the embodiments of the present invention, the target control channel candidate set includes at least two control channel candidates, at least two of these control channel candidates have different quantities of CCEGs, and a CCEG set of one of the at least two control channel candidates includes a CCEG of another of the at least two control channel candidates.

With reference to the fifth aspect of the embodiments of the present invention, in a second implementation of the fifth aspect of the embodiments of the present invention, the processor further specifically performs the following step:

determining a demodulation reference signal of one or more CCEGs corresponding to each measurement reference signal.

With reference to the second implementation of the fifth aspect of the embodiments of the present invention, in a third implementation of the first aspect of the embodiments of the present invention, the processor further specifically performs the following steps:

determining a CCEG included in the first target control channel candidate; and after a quantity of CCEGs in the first target control channel candidate and a quantity of CCEs included in each CCEG are determined, determining, based on the quantity of CCEGs, the quantity of CCEs, and the quantity of measurement reference signals, the demodulation reference signal corresponding to each measurement reference signal.

A sixth aspect of the embodiments of the present invention provides a server, where the server includes a processor, a memory, a transceiver, and a bus system, where the memory is configured to store a program; and the processor is configured to execute the program in the memory to specifically perform the following steps:

determining one or more control channel element groups CCEGs of a first target control channel candidate in a target control channel candidate set, where each CCEG includes one or more CCEs; determining target downlink control information DCI carried on the first target control channel candidate, where the target DCI includes information about a quantity of measurement reference signals and information about a time-frequency resource corresponding to each measurement reference signal, and the measurement reference signal includes a demodulation reference signal of the first target control channel candidate and/or a demodulation reference signal of at least one second target control channel candidate in the target control channel candidate set; and sending the target DCI by using the one or more CCEGs of the first target control channel candidate.

With reference to the sixth aspect of the embodiments of the present invention, in a first implementation of the sixth aspect of the present invention, the information about the time-frequency resource corresponding to each measurement reference signal includes a demodulation reference signal of one or more CCEGs corresponding to each measurement reference signal.

With reference to the sixth aspect of the embodiments of the present invention, in a second implementation of the sixth aspect of the present invention, each measurement reference signal is corresponding to a different precoding matrix.

With reference to the sixth aspect of the embodiments of the present invention, in a third implementation of the sixth aspect of the present invention, a CCEG corresponding to at least one of the measurement reference signals includes at least the CCEG of the first target control channel candidate.

With reference to any one of the sixth aspect of the embodiments of the present invention, and the first to the third implementations of the sixth aspect, in a fourth implementation of the sixth aspect of the present invention, the processor further specifically performs the following steps:

determining a modulation and coding scheme corresponding to each CCEG of the first target control channel candidate; modulating and coding, by using the modulation and coding scheme, target DCI carried in each CCEG; and sending the modulated and coded target DCI by using a corresponding CCEG.

It can be learned from the foregoing technical solution that the embodiments of the present invention have the following advantages:

In the embodiments of the present invention, the sending network element may determine a quantity of CCEGs included in a control channel candidate, a quantity of CCEs included in each CCEG, a quantity of measurement reference signals, and a time-frequency resource corresponding to each measurement reference signal, and add DCI to one or more CCEGs included in the control channel candidate, where the DCI includes the quantity of measurement reference signals. After the receiving network element obtains the DCI through blind detection and learns, based on the DCI, of the quantity of measurement reference signals and the time-frequency resource corresponding to each measurement reference signal, the receiving network element may calculate channel quality information corresponding to each measurement reference signal and report the channel quality information to the sending network element, so that the sending network element can determine channel quality information corresponding to all measurement reference signals. This improves measurement accuracy.

DESCRIPTION OF EMBODIMENTS

Figure 1:
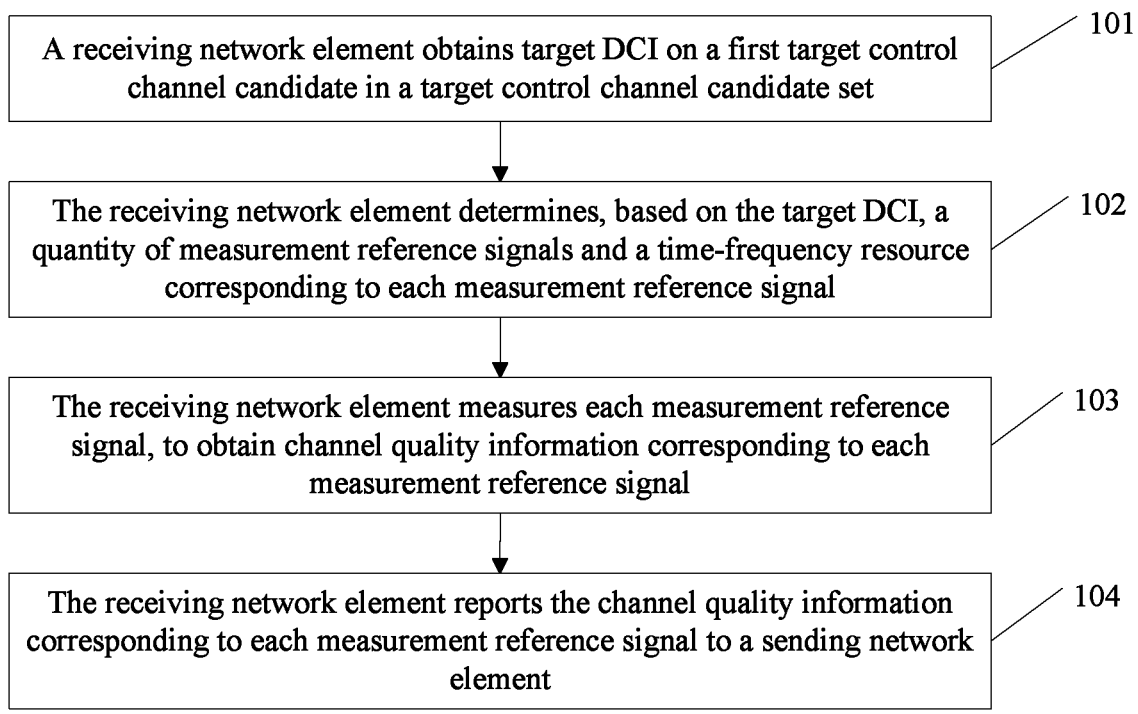
FIG. 1 is a flowchart of an embodiment of a downlink control channel transmission method according to the embodiments of the present invention.

The following clearly describes the technical solutions in the embodiments of the present invention with reference to the accompanying drawings in the embodiments of the present invention. Apparently, the described embodiments are merely some but not all of the embodiments of the present invention.

In the specification, claims, and accompanying drawings of the present invention, the terms "first", "second", "third", "fourth", and so on (if any) are intended to distinguish similar objects, but do not necessarily indicate a specific order or sequence. It should be understood that the data termed in such a way are interchangeable in proper circumstances so that the embodiments of the present invention described herein can be implemented in orders other than the order illustrated or described herein. Moreover, the terms "include", "comprise", and any other variants mean to cover the non-exclusive inclusion, for example, a process, method, system, product, or device that includes a list of steps or units is not necessarily limited to those steps or units expressly listed, but may include other steps or units not expressly listed or inherent to such a process, method, system, product, or device.

For ease of understanding, the following first describes some terms and a system architecture in the embodiments of the present invention.

A sending network element in the embodiments of the present invention is a network element capable of sending a downlink control signal to a receiving network element to indicate subsequent downlink data signal transmission. The sending network element may be a base station, a transceiver site, or another network element. This is not specifically limited herein.

The receiving network element is a network element capable of performing blind detection on a downlink control signal sent by the sending network element to the receiving network element, to prepare for subsequent downlink data signal transmission. The receiving network element may be a mobile terminal or another network element. This is not specifically limited herein.

It should be noted that there may be one or more sending network elements and one or more receiving network elements in the embodiments of the present invention. When there are a plurality of sending network elements, the receiving network element needs to combine data sent by the plurality of sending network elements and perform blind detection on downlink control signals sent by the plurality of sending network elements to the receiving network element, to prepare for subsequent downlink data signal transmission.

The following describes in detail some background technologies in the embodiments of the present invention by using a base station as an example.

The base station adds DCI of a user to a downlink control channel sent for the user. The DCI is used to indicate information allocated by the base station to the user in subsequent downlink shared channel transmission such as a time-frequency resource location and a modulation and coding scheme, so that the user obtains downlink data sent to the user, in subsequent downlink shared channel transmission.

A minimum unit of a time-frequency resource occupied by a downlink control channel of a user is one control channel element (CCE). One CCE includes one or more time-frequency resource elements (RE). One RE is a time-frequency resource unit represented by one OFDM symbol in time domain and one subcarrier in frequency domain. For example, it is specified in a Long Term Evolution (LTE) system that one CCE includes 36 REs.

The base station determines, based on a quantity of symbols generated by performing signal processing procedures such as channel coding and modulation on the DCI of the user, an aggregation level n of a downlink control channel to be sent to the user, namely, a quantity n of CCEs that need to be occupied by the downlink control channel. In the LTE system, n∈{1,2,4,8}. Further, to determine a specific location of the CCE occupied by the downlink control channel in a time-frequency resource, a standard predefines, for each aggregation level, several candidate locations in which the downlink control channel can be placed. At an aggregation level, a set of all candidate locations is referred to as downlink control channel search space at this aggregation level.

After an aggregation level is determined, the base station selects a candidate location within downlink control channel search space at the aggregation level, to perform downlink control channel transmission for a corresponding user. During one transmission, the base station may perform downlink control channel transmission for a plurality of users. Downlink control channels of different users use different aggregation levels or are placed in different candidate locations at a same aggregation level. To ensure that a user can distinguish between a downlink control channel sent by the base station to the user and a downlink control channel sent by the base station to another user, a parameter specific to the user is further carried in the downlink control channel of the user.

When performing downlink control channel detection, the user performs blind detection because the user cannot learn of an aggregation level used by the base station and a control channel candidate location selected by the base station at the aggregation level. The user performs detection, in a particular order in the search space at each aggregation level predefined in the standard, in all candidate locations based on a specific parameter notified by the base station to the user, until detection succeeds, so as to obtain DCI to further indicate subsequent downlink data reception.

Based on the foregoing background, the following starts to describe a downlink control channel transmission method in the embodiments of the present invention. The method is first described from a perspective of a receiving network element. Referring to FIG. 1, an embodiment of the downlink control channel transmission method in the embodiments of the present invention includes the following steps.

101. The receiving network element obtains target DCI on a first target control channel candidate in a target control channel candidate set.

A sending network element determines one or more CCEGs of a control channel candidate A in the target control channel candidate set and determines target DCI carried on A. The target DCI includes information about a quantity of measurement reference signals and information about a time-frequency resource corresponding to each measurement reference signal. The measurement reference signal includes a demodulation reference signal of A and/or a demodulation reference signal of at least one control channel candidate B in the target control channel candidate set that is different from A. The sending network element sends the target DCI by using the one or more CCEGs of the control channel candidate A. The receiving network element obtains the target DCI on the first target control channel candidate. It should be noted that the first target control channel candidate is the control channel candidate A or a subset of A.

102. The receiving network element determines, based on the target DCI, a quantity of measurement reference signals and a time-frequency resource corresponding to each measurement reference signal.

After obtaining the target DCI, the receiving network element determines, based on the target DCI, the quantity of used measurement reference signals and the time-frequency resource corresponding to each measurement reference signal. The measurement reference signal includes a demodulation reference signal of the first target control channel candidate and/or a demodulation reference signal of at least one second target control channel candidate in the target control channel candidate set. It should be noted that the second target control channel candidate is a control channel candidate in the target control channel set that is different from the first target control channel candidate.

103. The receiving network element measures each measurement reference signal, to obtain channel quality information corresponding to each measurement reference signal.

After determining the quantity of measurement reference signals and the time-frequency resource corresponding to each measurement reference signal, the receiving network element measures each measurement reference signal, to obtain the channel quality information corresponding to each measurement reference signal.

It should be noted that the channel quality information includes a channel quality indicator (CQI). The CQI is an information indicator of channel quality. The CQI represents current channel quality and may be corresponding to a signal-to-noise ratio of a channel. The channel quality information may further include other information used to indicate channel quality. This is not specifically limited herein.

104. The receiving network element reports the channel quality information corresponding to each measurement reference signal to a sending network element.

After determining the channel quality information corresponding to each measurement reference signal, the receiving network element reports the information to the sending network element, so that the sending network element can perform, by referring to the information, precoding matrix adjustment for next downlink control channel transmission.

In this embodiment of the present invention, the sending network element may determine a quantity of CCEGs included in a control channel candidate, a quantity of CCEs included in each CCEG, a quantity of measurement reference signals, and a time-frequency resource corresponding to each measurement reference signal, and add DCI to one or more CCEGs included in the control channel candidate, where the DCI includes the quantity of measurement reference signals. After the receiving network element obtains the DCI through blind detection and learns, based on the DCI, of the quantity of measurement reference signals and the time-frequency resource corresponding to each measurement reference signal, the receiving network element may calculate channel quality information corresponding to each measurement reference signal and report the channel quality information to the sending network element, so that the sending network element can determine channel quality information corresponding to all measurement reference signals. This improves measurement accuracy.

Figure 2:
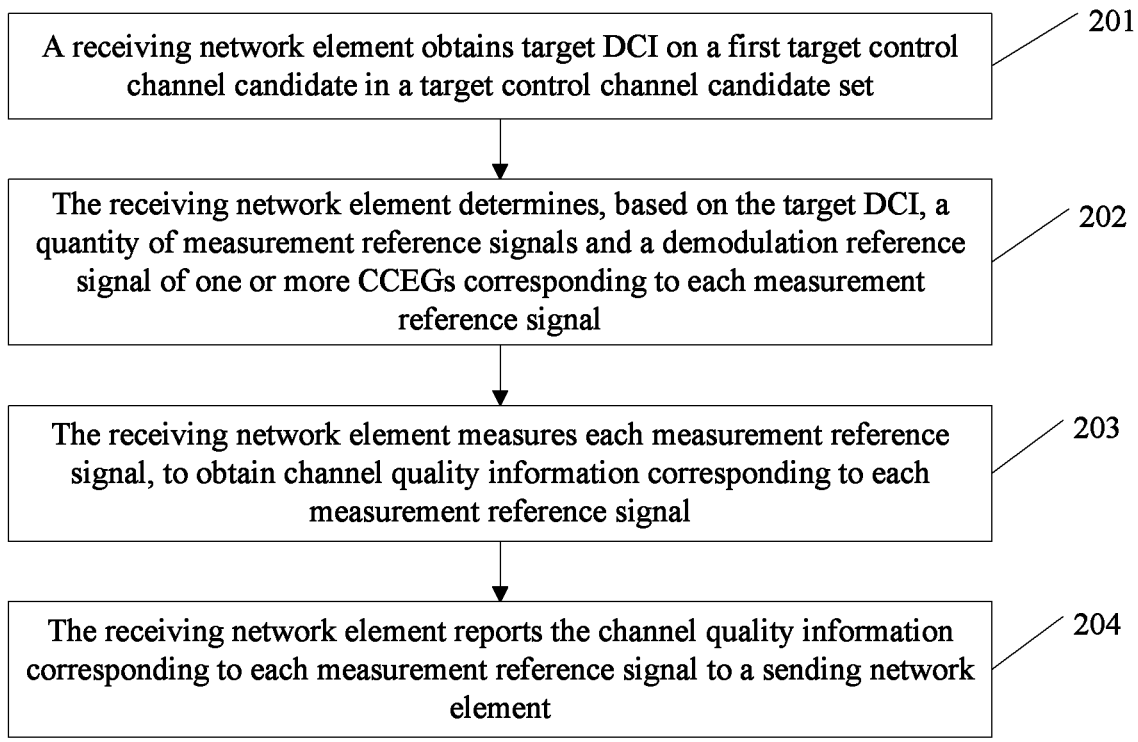
FIG. 2 is a flowchart of another embodiment of a downlink control channel transmission method according to the embodiments of the present invention.

For ease of understanding, the following describes in detail the downlink control channel transmission method in the embodiments of the present invention. Referring to FIG. 2, another embodiment of the downlink control channel transmission method in the embodiments of the present invention includes the following steps.

201. A receiving network element obtains target DCI on a first target control channel candidate in a target control channel candidate set.

A sending network element determines one or more CCEGs of a control channel candidate A in the target control channel candidate set and determines target DCI carried on A. The target DCI includes information about a quantity of measurement reference signals and information about a time-frequency resource corresponding to each measurement reference signal. The measurement reference signal includes a demodulation reference signal of A and/or a demodulation reference signal of at least one control channel candidate B in the target control channel candidate set that is different from A. The sending network element sends the target DCI by using the CCEG of A. The receiving network element obtains the target DCI on the first target control channel candidate. It should be noted that the first target control channel candidate is the control channel candidate A or a subset of the control channel candidate A.

Specifically, the receiving network element may obtain the target DCI in the following manner:

The receiving network element performs detection on each control channel candidate in the control channel candidate set. When performing detection on each control channel candidate, the receiving network element needs to perform detection on all possibilities of a quantity of CCEGs included in the control channel candidate. Possibilities of a quantity of CCEGs are in a one-to-one correspondence with CCE combination manners. When the receiving network element detects the target DCI in a CCE combination manner corresponding to a possibility of a quantity of CCEGs included in a control channel candidate, CCEGs in which the target DCI is detected constitute the first target control channel candidate. A specific detection manner may be that the receiving network element performs, by using one or more modulation and coding schemes corresponding to the control channel candidate, signal processing such as demodulation and decoding on information corresponding to each possibility of a quantity of CCEGs, and if the target DCI can be obtained after the processing, the receiving network element determines that the target DCI is detected. The receiving network element may alternatively detect the target DCI in another manner. This is not specifically limited herein.

The following uses an example to explain each possibility of a quantity of CCEGs corresponding to the control channel candidate. Assuming that a control channel candidate includes a CCEG 1 and a CCEG 2, and the CCEG 1 and the CCEG 2 each include only one CCE, the CCEG 1 includes a CCE 1, and the CCEG 2 includes a CCE 2. In this case, a first possibility of a quantity of CCEGs corresponding to the control channel candidate is that one CCE is used as one CCEG, and correspondingly, the receiving network element needs to perform separate detection on the CCEG 1 and the CCEG 2; a second possibility of a quantity of CCEGs corresponding to the control channel candidate is that two CCEs are used as one CCEG, and correspondingly, the receiving network element needs to perform joint detection on the CCE 1 and the CCE 2 as a whole. It should be understood that the foregoing is only an example of each CCE combination corresponding to a control channel candidate, and constitutes no limitation on the present invention.

202. The receiving network element determines, based on the target DCI, a quantity of measurement reference signals and a demodulation reference signal of one or more CCEGs corresponding to each measurement reference signal.

After obtaining the target DCI, the receiving network element determines, based on the target DCI, the quantity of measurement reference signals and the demodulation reference signal of the one or more CCEGs corresponding to each measurement reference signal. The measurement reference signal includes a demodulation reference signal of the first target control channel candidate and/or a demodulation reference signal of at least one second target control channel candidate in the target control channel candidate set.

It should be noted that when time-frequency resources occupied by control channel candidates at different aggregation levels partially overlap, the target control channel candidate set includes at least two control channel candidates, the at least two control channel candidates have different quantities of CCEGs, and a CCEG set of one of the control channel candidates includes a CCEG of another of the control channel candidates.

When information about a time-frequency resource corresponding to the measurement reference signal is a time-frequency resource on the first target control channel candidate, the receiving network element may determine, in the following manners, the demodulation reference signal of the one or more CCEGs corresponding to each measurement reference signal.

Manner 1: The target DCI includes a quantity of CCEGs corresponding to each measurement reference signal.

The target DCI sent by the sending network element further includes the quantity of CCEGs corresponding to each measurement reference signal. In this case, when reading the target DCI, in addition to the quantity of measurement reference signals, the receiving network element further obtains the quantity of CCEGs corresponding to each measurement reference signal.

The receiving network element determines a quantity of CCEs included in each CCEG. In a time-frequency resource occupied by one CCE, a time-frequency resource carrying a demodulation reference signal is known. In this case, the receiving network element can determine a time-frequency resource occupied by a demodulation reference signal of each CCEG.

After determining the demodulation reference signal of each CCEG and a CCEG corresponding to each measurement reference signal, the receiving network element can obtain the demodulation reference signal of the one or more CCEGs corresponding to each measurement reference signal.

Manner 2: The target DCI includes a total quantity of CCEGs corresponding to all measurement reference signals.

The target DCI sent by the sending network element further includes the total quantity of CCEGs corresponding to all the measurement reference signals. In this case, when reading the target DCI in the foregoing manner, in addition to the quantity of measurement reference signals, the receiving network element further obtains the total quantity of CCEGs corresponding to all the measurement reference signals.

Because in a same control channel candidate, quantities of CCEGs corresponding to all the measurement reference signals are the same, a quantity of CCEGs corresponding to each measurement reference signal can be obtained by dividing, by the quantity of measurement reference signals, the total quantity of CCEGs corresponding to all the measurement reference signals.

Likewise, after determining a quantity of CCEs included in a CCEG carrying the target DCI, the receiving network element determines, based on a time-frequency resource of a demodulation reference signal included in one CCE, a time-frequency resource occupied by a demodulation reference signal of each CCEG.

Finally, the demodulation reference signal of the one or more CCEGs corresponding to each measurement reference signal can be obtained based on the quantity of CCEGs corresponding to each measurement reference signal and the time-frequency resource occupied by the demodulation reference signal of each CCEG.

Manner 3: The target DCI includes a quantity of demodulation reference signals corresponding to each measurement reference signal.

The target DCI sent by the sending network element further includes the quantity of demodulation reference signals corresponding to each measurement reference signal. In this case, when reading the target DCI in the foregoing manner, in addition to the quantity of measurement reference signals, the receiving network element further obtains the quantity of demodulation reference signals corresponding to each measurement reference signal. The receiving network element can directly determine the demodulation reference signal corresponding to each measurement reference signal.

Manner 4: The target DCI includes a quantity of demodulation reference signals corresponding to all measurement reference signals.

The target DCI sent by the sending network element further includes the quantity of demodulation reference signals corresponding to all the measurement reference signals. In this case, when reading the target DCI in the foregoing manner, in addition to the quantity of measurement reference signals, the receiving network element further obtains the total quantity of demodulation reference signals corresponding to all the measurement reference signals. The receiving network element can obtain the demodulation reference signal corresponding to each measurement reference signal by dividing, by the quantity of measurement reference signals, the total quantity of demodulation reference signals corresponding to all the measurement reference signals.

If a time-frequency resource occupied by a control channel candidate on which the receiving network element is performing detection and a time-frequency resource occupied by another control channel candidate do not overlap, when time-frequency resources occupied by control channel candidates at different aggregation levels do not overlap, the sending network element may determine, in the following manner, the demodulation reference signal of the one or more CCEGs corresponding to each measurement reference signal.

Manner 5: The sending network element deduces the demodulation reference signal of the one or more CCEGs corresponding to each measurement reference signal on the first target control channel candidate.

The sending network element determines a CCEG included in the first target control channel candidate, and determines, based on the CCEG included in the first target control channel candidate and the quantity of measurement reference signals, the demodulation reference signal of the one or more CCEGs corresponding to each measurement reference signal.

Specifically, the sending network element may first determine, based on the CCEG in which the target DCI is detected on the first target control channel candidate, a quantity of CCEs included in each CCEG of the first target control channel candidate. For example, if the sending network element detects the target DCI when performing joint detection on the CCE 1 and the CCE 2, the CCE 1 and the CCE 2 constitute one CCEG, and the CCEG is a CCEG included in the first target control channel candidate. Then, the sending network element determines an aggregation level corresponding to the first target control channel candidate, may determine, based on the aggregation level, a total quantity of CCEs included in the first target control channel candidate, and may determine, based on the total quantity of CCEs and the quantity of CCEs included in each CCEG, a total quantity of CCEGs included in the first target control channel candidate. Finally, the sending network element determines, based on the quantity of measurement reference signals and the total quantity of CCEGs, a quantity of CCEGs included in each measurement reference signal, and may determine, based on a demodulation reference signal of each CCEG, the demodulation reference signal corresponding to each measurement reference signal on the first target control channel candidate.

203. The receiving network element measures each measurement reference signal, to obtain channel quality information corresponding to each measurement reference signal.

After determining, based on the target DCI, the quantity of measurement reference signals and the demodulation reference signal of the one or more CCEGs corresponding to each measurement reference signal, the receiving network element determines the channel quality information for each measurement reference signal, by measuring channel quality information of the demodulation reference signal.

Specifically, for each measurement reference signal, the receiving network element may calculate an average of channel quality information of all demodulation reference signals included in the measurement reference signal, and use the average as channel quality information of the measurement reference signal. Alternatively, for each measurement reference signal, the receiving network element may calculate an average of channel quality information, with a maximum value and a minimum value excluded, of all demodulation reference signals included in the measurement reference signal, and use the average as channel quality information of the measurement reference signal. The receiving network element may alternatively determine the channel quality information for each measurement reference signal in another manner. This is not specifically limited herein.

204. The receiving network element reports the channel quality information corresponding to each measurement reference signal to a sending network element.

After determining the channel quality information for each measurement reference signal, the receiving network element reports the information to the sending network element, so that the sending network element can perform, by referring to the information, precoding matrix adjustment for next control channel transmission.

In this embodiment of the present invention, the sending network element may determine a quantity of CCEGs included in a control channel candidate, a quantity of CCEs included in each CCEG, a quantity of measurement reference signals, and a time-frequency resource corresponding to each measurement reference signal, and add DCI to one or more CCEGs included in the control channel candidate, where the DCI includes the quantity of measurement reference signals. After the receiving network element obtains the DCI through blind detection and learns, based on the DCI, of the quantity of measurement reference signals and the time-frequency resource corresponding to each measurement reference signal, the receiving network element may calculate channel quality information corresponding to each measurement reference signal and report the channel quality information to the sending network element, so that the sending network element can determine channel quality information corresponding to all measurement reference signals. This improves measurement accuracy.

Besides, this embodiment of the present invention provides a plurality of specific implementations of determining, by the receiving network element, a time-frequency resource corresponding to each measurement reference signal, thereby improving flexibility of the solution.

Figure 3:
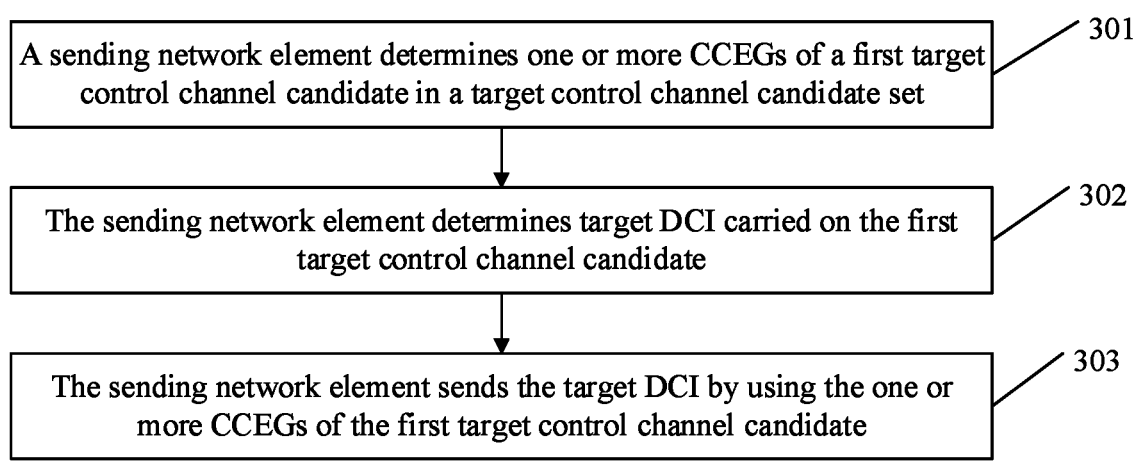
FIG. 3 is a flowchart of another embodiment of a downlink control channel transmission method according to the embodiments of the present invention.

The following describes the downlink control channel transmission method in the embodiments of the present invention from a perspective of a sending network element. Referring to FIG. 3, an embodiment of the downlink control channel transmission method in the embodiments of the present invention includes the following steps.

301. The sending network element determines one or more CCEGs of a first target control channel candidate in a target control channel candidate set; or the sending network element determines one or more CCEGs corresponding to a first target control channel candidate in a target control channel candidate set, and a CCE included in each CCEG, where each CCEG includes at least one CCE.

It should be noted that a total quantity of CCEs included in the target control channel candidate is obtained by multiplying a quantity of CCEGs by a quantity of CCEs included in each CCEG, to determine an aggregation level corresponding to the target control channel candidate.

It should be further noted that the CCEG corresponding to the first target control channel candidate is predefined by the sending network element, or may be determined in another manner. This is not specifically limited herein. The CCE included in each CCEG may be determined by using a quantity of symbols generated based on target DCI of a receiving network element, or may be determined in another manner. This is not specifically limited herein.

It should be further noted that the first target control channel candidate in this embodiment of the present invention is not completely equivalent to the first target control channel candidate in the embodiment corresponding to FIG. 1 or FIG. 2, and a target candidate location in this embodiment of the present invention is a control channel candidate selected by the sending network element for downlink control channel transmission with the receiving network element.

302. The sending network element determines target DCI carried on the first target control channel candidate.

After determining the one or more CCEGs corresponding to the first target control channel candidate, the sending network element determines the target DCI carried on the first target control channel candidate. The target DCI includes a quantity of measurement reference signals and a time-frequency resource corresponding to each measurement reference signal. The measurement reference signal includes a demodulation reference signal of the first target control channel candidate and/or a demodulation reference signal of at least one second target control channel candidate in the target control channel candidate set.

303. The sending network element sends the target DCI by using the one or more CCEGs of the first target control channel candidate.

The sending network element sends the target DCI by using the one or more CCEGs of the first target control channel candidate, so that the receiving network element receives the target DCI on the first target control channel candidate or a subset of the first target control channel candidate and measures channel quality information for each measurement reference signal.

It should be noted that if the first target control channel candidate is corresponding to one CCEG, the sending network element needs to add the target DCI to the CCEG; or if the first target control channel candidate is corresponding to a plurality of CCEGs, to improve reliability, the sending network element may add the target DCI to each CCEG. It should be understood that when the first target control channel candidate is corresponding to a plurality of CCEGs, the sending network element may alternatively add the target DCI to only one or more of the CCEGs. This is not specifically limited herein.

In this embodiment of the present invention, the sending network element may determine a quantity of CCEGs included in a control channel candidate, a quantity of CCEs included in each CCEG, a quantity of measurement reference signals, and a time-frequency resource corresponding to each measurement reference signal, and add DCI to one or more CCEGs included in the control channel candidate, where the DCI includes the quantity of measurement reference signals. After the receiving network element obtains the DCI through blind detection and learns, based on the DCI, of the quantity of measurement reference signals and the time-frequency resource corresponding to each measurement reference signal, the receiving network element may calculate channel quality information corresponding to each measurement reference signal and report the channel quality information to the sending network element, so that the sending network element can determine channel quality information corresponding to all measurement reference signals. This improves measurement accuracy.

Based on the embodiment corresponding to FIG. 3, in an embodiment of the present invention, information about the time-frequency resource corresponding to each measurement reference signal includes a demodulation reference signal of one or more CCEGs corresponding to each measurement reference signal. The demodulation reference signal of the one or more CCEGs is the demodulation reference signal of the first target control channel candidate and/or the demodulation reference signal of the at least one second target control channel candidate in the target control channel candidate set.

A precoding matrix is a spatial precoding matrix, acts on different antenna ports, and is used to concentrate transmit energy in a relatively narrow spatial range or a direction. In the embodiment corresponding to FIG. 3, each measurement reference signal may be corresponding to a same precoding matrix or a different precoding matrix. When each measurement reference signal is corresponding to a different precoding matrix, after the receiving network element measures and reports the channel quality information for each measurement reference signal, the sending network element may perform, by referring to the channel quality information, precoding matrix adjustment for next control channel transmission. Specifically, the sending network element may determine one or more measurement reference signals with highest channel quality among these measurement reference signals, and use a precoding matrix corresponding to the one or more measurement reference signals with highest channel quality to perform spatial precoding during next control channel transmission. The sending network element may further determine one or more measurement reference signals with lowest channel quality among these measurement reference signals, and forbid using a precoding matrix corresponding to the one or more measurement reference signals with lowest channel quality during next control channel transmission. The sending network element may alternatively perform precoding matrix adjustment for next control channel transmission in another manner. This is not specifically limited herein.

In this embodiment of the present invention, each measurement reference signal may be corresponding to a different precoding matrix. The sending network element may select, based on the channel quality information reported by the receiving network element, a most proper precoding matrix to perform next control channel transmission, so as to improve transmission quality.

Based on the embodiment corresponding to FIG. 3, in an embodiment of the present invention, a CCEG corresponding to at least one measurement reference signal is the CCEG of the first target control channel. In this case, after receiving the target DCI on the first target control channel candidate, the receiving network element can measure channel quality information of a measurement reference signal corresponding to the first target control channel candidate.

This embodiment of the present invention provides an implementation in which the receiving network element can measure and report channel quality information for each measurement reference signal on a control channel candidate corresponding to the receiving network element, thereby improving flexibility of the solution.

Based on the embodiment corresponding to FIG. 3, in this embodiment of the present invention, the sending network element may send the target DCI in the following manner:

The sending network element determines a modulation and coding scheme corresponding to each CCEG of the first target control channel candidate, modulates and codes, by using the modulation and coding scheme, target DCI carried in each CCEG, and sends the modulated and coded target DCI by using a corresponding CCEG. Herein, the modulation and coding scheme used by each CCEG is definite, and target DCI carried in the CCEGs has same content. Therefore, each CCEG is self-decodable. To be specific, for a CCEG, the receiving network element can obtain target DCI only by performing processing such as demodulation and decoding on the target DCI by using a modulation and coding scheme corresponding to the CCEG, without relying on content of another CCEG included in the control channel candidate. It should be understood that the modulation and coding schemes corresponding to the CCEGs may be the same. For example, all the CCEGs use QPSK modulation and a rate 1/3 convolutional code and select a same redundancy version. The modulation and coding schemes corresponding to the CCEGs may alternatively be different. For example, all the CCEGs use QPSK modulation and a rate 1/3 convolutional code, but select different redundancy versions. This is not specifically limited herein.

It should be noted that in addition to modulation and coding, the sending network element may further perform other processing on the target DCI before adding the target DCI to the CCEG. This is not specifically limited herein.

In this embodiment of the present invention, each CCEG carrying the target DCI is self-decodable, so that the receiving network element does not need to rely on content of another CCEG included in the control channel candidate. This improves a DCI detection success rate and DCI detection efficiency.

Figure 4:
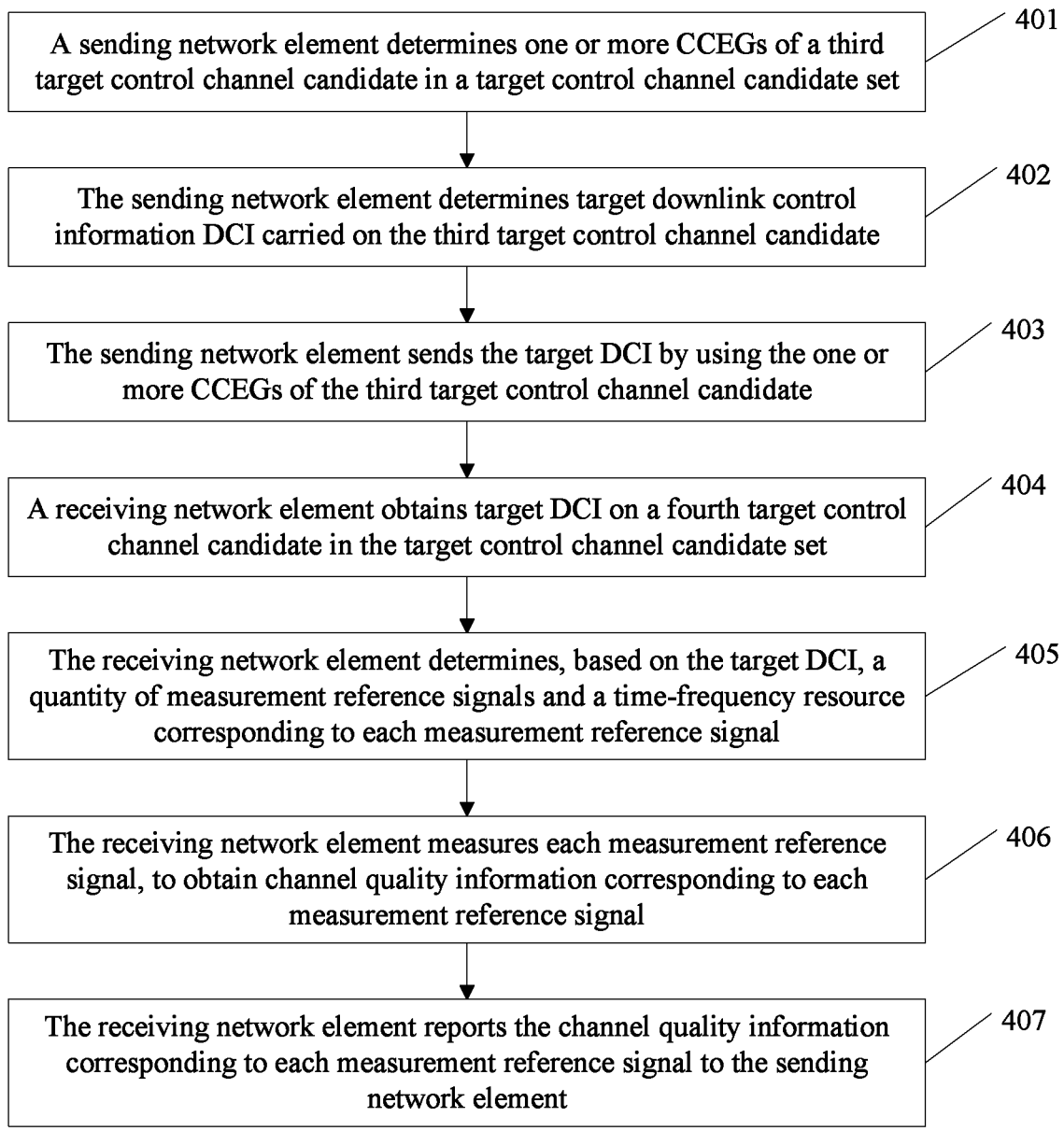
FIG. 4 is a flowchart of another embodiment of a downlink control channel transmission method according to the embodiments of the present invention.

The following describes the downlink control channel transmission method in the embodiments of the present invention in a scenario in which a sending network element interacts with a receiving network element. Referring to FIG. 4, another embodiment of the downlink control channel transmission method in the embodiments of the present invention includes the following steps.

401. The sending network element determines one or more CCEGs of a third target control channel candidate in a target control channel candidate set.

The sending network element determines the one or more CCEGs corresponding to the third target control channel candidate in the target control channel candidate set and a CCE included in each CCEG, where each CCEG includes at least one CCE.

It should be noted that a total quantity of CCEs included in a target control channel candidate is obtained by multiplying a quantity of CCEGs by a quantity of CCEs included in each CCEG, to determine an aggregation level corresponding to the target control channel candidate.

It should be further noted that the CCEG corresponding to the third target control channel candidate is predefined by the sending network element, or may be determined in another manner. This is not specifically limited herein. The CCE included in each CCEG may be determined by using a quantity of symbols generated based on target DCI of the receiving network element, or may be determined in another manner. This is not specifically limited herein.

402. The sending network element determines target downlink control information DCI carried on the third target control channel candidate.

After determining the one or more CCEGs corresponding to the third target control channel candidate, the sending network element determines the target DCI carried on the third target control channel candidate. The target DCI includes a quantity of measurement reference signals and a time-frequency resource corresponding to each measurement reference signal. The measurement reference signal includes a demodulation reference signal of the third target control channel candidate and/or a demodulation reference signal of at least one second target control channel candidate in the target control channel candidate set.

It should be noted that in this embodiment of the present invention, information about the time-frequency resource corresponding to each measurement reference signal includes a demodulation reference signal of one or more CCEGs corresponding to each measurement reference signal. The demodulation reference signal of the one or more CCEGs is the demodulation reference signal of the third target control channel candidate and/or the demodulation reference signal of the at least one second target control channel candidate in the target control channel candidate set. The information about the time-frequency resource corresponding to each measurement reference signal may further include other information. This is not specifically limited herein.

403. The sending network element sends the target DCI by using the one or more CCEGs of the third target control channel candidate.

The sending network element sends the target DCI by using the one or more CCEGs of the third target control channel candidate. It should be noted that if the third target control channel candidate is corresponding to one CCEG, the sending network element needs to add the target DCI to the CCEG; or if the third target control channel candidate is corresponding to a plurality of CCEGs, to improve reliability, the sending network element may add the target DCI to each CCEG. It should be understood that when the third target control channel candidate is corresponding to a plurality of CCEGs, the sending network element may alternatively add the target DCI to only one or more of the CCEGs. This is not specifically limited herein.

Specifically, the sending network element may send the target DCI in the following manner:

The sending network element determines a modulation and coding scheme corresponding to each CCEG of the third target control channel candidate, modulates and codes, by using the modulation and coding scheme, target DCI carried in each CCEG, and sends the modulated and coded target DCI by using a corresponding CCEG. Herein, the modulation and coding scheme used by each CCEG is definite, and target DCI carried in the CCEGs has same content. Therefore, each CCEG is self-decodable. To be specific, for a CCEG, the receiving network element can obtain target DCI only by performing processing such as demodulation and decoding on the target DCI by using a modulation and coding scheme corresponding to the CCEG, without relying on content of another CCEG included in the control channel candidate. It should be understood that the modulation and coding schemes corresponding to the CCEGs may be the same. For example, all the CCEGs use QPSK modulation and a rate 1/3 convolutional code and select a same redundancy version. The modulation and coding schemes corresponding to the CCEGs may alternatively be different, for example, all the CCEGs use QPSK modulation and a rate 1/3 convolutional code, but select different redundancy versions. This is not specifically limited herein.

It should be noted that the sending network element may alternatively send the target DCI in another manner. This is not specifically limited herein.

404. The receiving network element obtains target DCI on a fourth target control channel candidate in the target control channel candidate set.

The receiving network element obtains the target DCI on the fourth target control channel candidate in the target control channel set. It should be noted that the fourth target control channel candidate may be the third target control channel candidate, or may be a subset of the third target control channel candidate.

405. The receiving network element determines, based on the target DCI, a quantity of measurement reference signals and a time-frequency resource corresponding to each measurement reference signal.

After obtaining the target DCI, the receiving network element determines, based on the target DCI, the quantity of measurement reference signals and a demodulation reference signal of one or more CCEGs corresponding to each measurement reference signal. The measurement reference signal includes a demodulation reference signal of the fourth target control channel candidate and/or the demodulation reference signal of the at least one second target control channel candidate in the target control channel candidate set.

It should be noted that when time-frequency resources occupied by control channel candidates at different aggregation levels partially overlap, the target control channel candidate set includes at least two control channel candidates, the at least two control channel candidates have different quantities of CCEGs, and a CCEG set of one of the control channel candidates includes a CCEG of another of the control channel candidates. In this case, the fourth target control channel candidate is a subset of the third target control channel candidate.

A manner of determining, by the receiving network element, the time-frequency resource corresponding to each measurement reference signal is related to whether search space at aggregation levels overlaps and information added by the sending network element to the target DCI. For details, refer to the manner in step 202 in the embodiment corresponding to FIG. 2. Details are not described herein again.

406. The receiving network element measures each measurement reference signal, to obtain channel quality information corresponding to each measurement reference signal.

After determining, based on the target DCI, the quantity of measurement reference signals and the demodulation reference signal of the one or more CCEGs corresponding to each measurement reference signal, the receiving network element measures channel quality information of the demodulation reference signal corresponding to each measurement reference signal, and determines the channel quality information for each measurement reference signal based on the channel quality information of the demodulation reference signal.

Specifically, for each measurement reference signal, the receiving network element may calculate an average of channel quality information of all demodulation reference signals included in the measurement reference signal, and use the average as channel quality information of the measurement reference signal. Alternatively, for each measurement reference signal, the receiving network element may calculate an average of channel quality information, with a maximum value and a minimum value excluded, of all demodulation reference signals included in the measurement reference signal, and use the average as channel quality information of the measurement reference signal. The receiving network element may alternatively determine the channel quality information for each measurement reference signal in another manner. This is not specifically limited herein.

407. The receiving network element reports the channel quality information corresponding to each measurement reference signal to the sending network element.

After determining the channel quality information for each measurement reference signal, the receiving network element reports the information to the sending network element, so that the sending network element can perform, by referring to the information, precoding matrix adjustment for next control channel transmission. It should be noted that each measurement reference signal may be corresponding to a same precoding matrix or a different precoding matrix. When each measurement reference signal is corresponding to a different precoding matrix, the receiving network element may perform precoding matrix adjustment for next control channel transmission in the following manner: determining one or more measurement reference signals with highest channel quality among these measurement reference signals, and using a precoding matrix corresponding to the one or more measurement reference signals with highest channel quality to perform spatial precoding during next transmission; or determining one or more measurement reference signals with lowest channel quality among these measurement reference signals, and forbidding using a precoding matrix corresponding to the one or more measurement reference signals with lowest channel quality during next transmission. Alternatively, another manner may also be used, and is not specifically limited herein.

In this embodiment of the present invention, the sending network element may determine a quantity of CCEGs included in a control channel candidate, a quantity of CCEs included in each CCEG, a quantity of measurement reference signals, and a time-frequency resource corresponding to each measurement reference signal, and add DCI to one or more CCEGs included in the control channel candidate, where the DCI includes the quantity of measurement reference signals. After the receiving network element obtains the DCI through blind detection and learns, based on the DCI, of the quantity of measurement reference signals and the time-frequency resource corresponding to each measurement reference signal, the receiving network element may calculate channel quality information corresponding to each measurement reference signal and report the channel quality information to the sending network element, so that the sending network element can determine channel quality information corresponding to all measurement reference signals. This improves measurement accuracy.

For ease of understanding, the following uses a specific example to describe the downlink control channel transmission method in the embodiments of the present invention.

In this specific example, a base station A and user equipment B perform control channel transmission.

Figure 5:
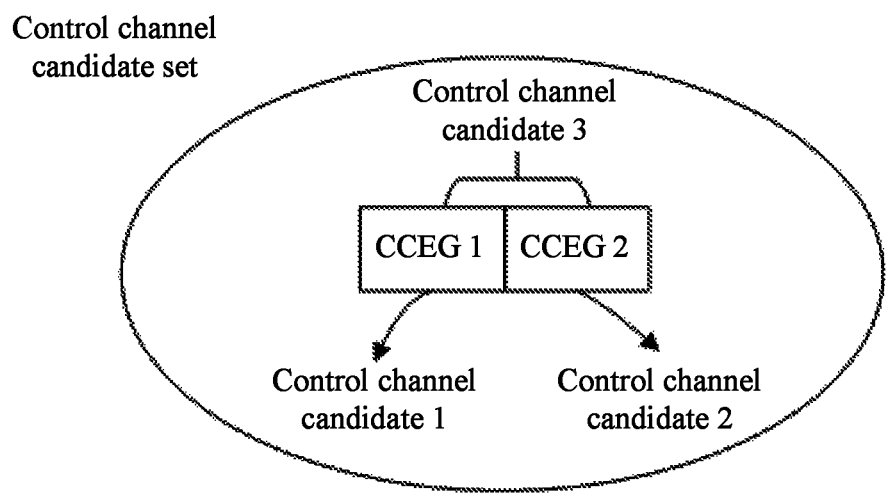
FIG. 5 is a schematic diagram of an embodiment of a target control channel candidate set of a downlink control channel according to the embodiments of the present invention.

As shown in FIG. 5, a control channel candidate set of the user equipment B includes three control channel candidates: control channel candidates 1, 2, and 3. The control channel candidates 1 and 2 each include one CCEG. The control channel candidate 3 includes two CCEGs. A CCEG set (a CCEG 1 and a CCEG 2) of the control channel candidate 3 includes the CCEG of the control channel candidate 1 and the CCEG of the control channel candidate 2. Each CCEG occupies a particular quantity of CCEs, and each CCE occupies a particular quantity of time-frequency resources. In the time-frequency resources occupied by each CCEG, there are a plurality of time-frequency resources carrying a demodulation reference signal. The demodulation reference signal is a signal known to the base station A and the user equipment B, and may be used by the user equipment B to demodulate a channel. The demodulation reference signal is referred to as a demodulation reference signal of this CCEG. In this application scenario, each CCEG includes one CCE.

The base station A selects, from the control channel candidate set of the user equipment B, the control channel candidate 3 (a first target control channel candidate) to carry DCI 1 of the user equipment B. Therefore, the first target control channel candidate includes two CCEGs: the CCEG 1 and the CCEG 2. The base station A defines the following information included in the DCI 1 of the user equipment B carried on the first target control channel candidate: Two measurement reference signals are used during this transmission, a measurement reference signal 1 is corresponding to a demodulation reference signal of the CCEG 1, and a measurement reference signal 2 is corresponding to a demodulation reference signal of the CCEG 2.

The base station A adds the DCI 1 to the CCEG 1 and the CCEG 2. First, the base station A selects a manner X1 to perform signal processing such as coding and modulation on the DCI 1, and adds DCI 1 processed based on X1 to the CCEG 1. Then, the base station A selects a manner X2 to perform signal processing such as coding and modulation on the DCI 1, and adds DCI 1 processed based on X2 to the CCEG 2. Coding and modulation of the CCEG 1 and the CCEG 2 can make it possible for a receive end to separately demodulate and decode the CCEG 1 and the CCEG 2. X1 and X2 may be the same. For example, they both use QPSK modulation and a rate 1/3 convolutional code and select a same redundancy version. X1 and X2 may be different. For example, they both use QPSK modulation and a rate 1/3 convolutional code, but select different redundancy versions.

The base station A determines that a spatial precoding matrix corresponding to the measurement reference signal 1 is M1, and M1 includes a set of complex numbers and acts on different antenna ports. The base station A determines that a spatial precoding matrix corresponding to the measurement reference signal 2 is M2, and M2 includes a set of complex numbers and acts on different antenna ports. The base station A uses the precoding matrix M1 to send the DCI 1 in the CCEG 1 and uses the precoding matrix M2 to send the DCI 1 in the CCEG 2.

The user equipment B performs, in a target control channel candidate set, detection on all control channel candidates in descending order of quantities of CCEGs included in the control channel candidates. In this actual application scenario, in the target control channel candidate set of the base station, there is a case in which a CCEG set of a target control channel candidate includes a CCEG of another target control channel candidate. Therefore, the user equipment B may perform detection on a second target control channel candidate (including the CCEG 1 and the CCEG 2) in the figure in the following two cases: (1) The CCEG 1 and the CCEG 2 are used as two independent control channel candidates for separate detection; (2) the CCEG 1 and the CCEG 2 are used as one control channel candidate for detection.

When the user equipment B performs detection in case (1), if the DCI 1 is detected in the CCEG 1 in the manner X1, the CCEG 1 is the first target control channel candidate. The user equipment B learns, based on the DCI 1, that two measurement reference signals are used during this transmission, the measurement reference signal 1 is corresponding to the demodulation reference signal of the CCEG 1 (the first target control channel candidate), and the measurement reference signal 2 is corresponding to the demodulation reference signal of the CCEG 2 (belonging to the second target control channel candidate). The user equipment B separately measures the demodulation reference signal of the CCEG 1 and the demodulation reference signal of the CCEG 2, and calculates channel quality corresponding to the measurement reference signal 1 and channel quality corresponding to the measurement reference signal 2.

The user equipment B reports, to the base station A, the channel quality corresponding to the measurement reference signal 1 and the channel quality corresponding to the measurement reference signal 2.

Figure 6:
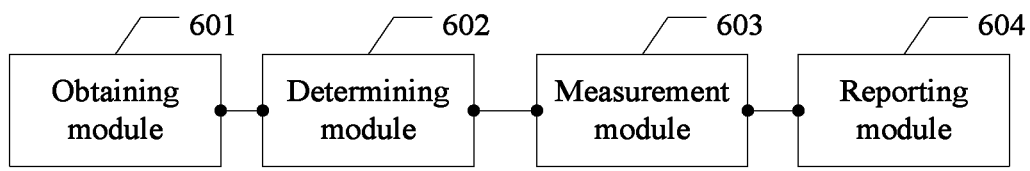
FIG. 6 is a schematic diagram of an embodiment of a receiving network element according to the embodiments of the present invention.

The foregoing describes the downlink control channel transmission method in the embodiments of the present invention. The following describes a receiving network element in the embodiments of the present invention. Referring to FIG. 6, an embodiment of the receiving network element in the embodiments of the present invention includes:

an obtaining module 601, configured to obtain target downlink control information DCI on a first target control channel candidate in a target control channel candidate set, where the target DCI is DCI of the receiving network element, and the first target control channel candidate includes one or more control channel element groups CCEGs;

a determining module 602, configured to determine, based on the target DCI, a quantity of measurement reference signals and a time-frequency resource corresponding to each measurement reference signal, where the measurement reference signal includes a demodulation reference signal of the first target control channel candidate and/or a demodulation reference signal of at least one second target control channel candidate in the target control channel candidate set;

a measurement module 603, configured to measure each measurement reference signal, to obtain channel quality information corresponding to each measurement reference signal; and a reporting module 604, configured to report the channel quality information corresponding to each measurement reference signal to a sending network element.

In this embodiment of the present invention, the sending network element may determine a quantity of CCEGs included in a control channel candidate, a quantity of CCEs included in each CCEG, a quantity of measurement reference signals, and a time-frequency resource corresponding to each measurement reference signal, and add DCI to one or more CCEGs included in the control channel candidate, where the DCI includes the quantity of measurement reference signals. After the receiving network element obtains the DCI through blind detection and learns, based on the DCI, of the quantity of measurement reference signals and the time-frequency resource corresponding to each measurement reference signal, the receiving network element may calculate channel quality information corresponding to each measurement reference signal and report the channel quality information to the sending network element, so that the sending network element can determine channel quality information corresponding to all measurement reference signals. This improves measurement accuracy.

Figure 7:
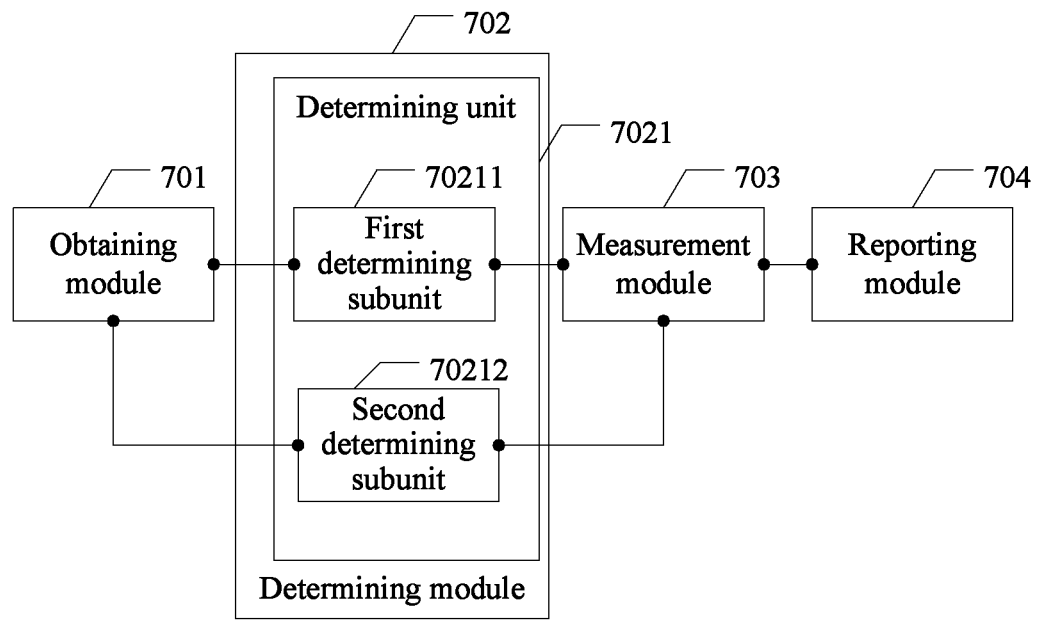
FIG. 7 is a schematic diagram of another embodiment of a receiving network element according to the embodiments of the present invention.

For ease of understanding, the following describes in detail the receiving network element in the embodiments of the present invention. Referring to FIG. 7, another embodiment of the receiving network element in the embodiments of the present invention includes:

an obtaining module 701, configured to obtain target downlink control information DCI on a first target control channel candidate in a target control channel candidate set, where the target DCI is DCI of the receiving network element, and the first target control channel candidate includes one or more control channel element groups CCEGs;

a determining module 702, configured to determine, based on the target DCI, a quantity of measurement reference signals and a time-frequency resource corresponding to each measurement reference signal, where the measurement reference signal includes a demodulation reference signal of the first target control channel candidate and/or a demodulation reference signal of at least one second target control channel candidate in the target control channel candidate set;

a measurement module 703, configured to measure each measurement reference signal, to obtain channel quality information corresponding to each measurement reference signal; and a reporting module 704, configured to report the channel quality information corresponding to each measurement reference signal to a sending network element.

The determining module 702 includes:

a determining unit 7021, configured to determine a demodulation reference signal of one or more CCEGs corresponding to each measurement reference signal.

Optionally, the determining unit 7021 may include:

a first determining subunit 70211, configured to determine a CCEG included in the first target control channel candidate; and a second determining subunit 70212, configured to determine, based on the CCEG included in the first target control channel candidate and the quantity of measurement reference signals, the demodulation reference signal of the one or more CCEGs corresponding to each measurement reference signal.

In this embodiment of the present invention, the sending network element may determine a quantity of CCEGs included in a control channel candidate, a quantity of CCEs included in each CCEG, a quantity of measurement reference signals, and a time-frequency resource corresponding to each measurement reference signal, and add DCI to one or more CCEGs included in the control channel candidate, where the DCI includes the quantity of measurement reference signals. After the receiving network element obtains the DCI through blind detection and learns, based on the DCI, of the quantity of measurement reference signals and the time-frequency resource corresponding to each measurement reference signal, the receiving network element may calculate channel quality information corresponding to each measurement reference signal and report the channel quality information to the sending network element, so that the sending network element can determine channel quality information corresponding to all measurement reference signals. This improves measurement accuracy.

Besides, this embodiment of the present invention provides a specific manner of determining, by the determining module 702, a demodulation reference signal of one or more CCEGs corresponding to each measurement reference signal, thereby improving implementability of the solution.

Figure 8:
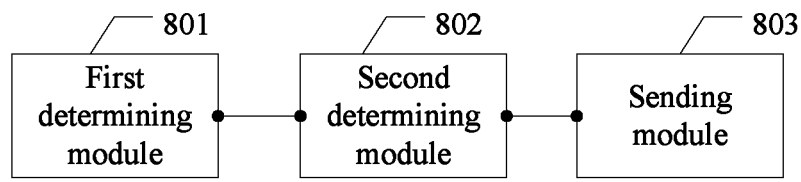
FIG. 8 is a schematic diagram of an embodiment of a sending network element according to the embodiments of the present invention.

The foregoing describes the receiving network element in the embodiments of the present invention. The following describes a sending network element in the embodiments of the present invention. Referring to FIG. 8, an embodiment of the sending network element in the embodiments of the present invention includes:

a first determining module 801, configured to determine one or more control channel element groups CCEGs of a first target control channel candidate in a target control channel candidate set, where each CCEG includes one or more CCEs;

a second determining module 802, configured to determine target downlink control information DCI carried on the first target control channel candidate, where the target DCI includes information about a quantity of measurement reference signals and information about a time-frequency resource corresponding to each measurement reference signal, and the measurement reference signal includes a demodulation reference signal of the first target control channel candidate and/or a demodulation reference signal of at least one second target control channel candidate in the target control channel candidate set; and a sending module 803, configured to send the target DCI by using the one or more CCEGs of the first target control channel candidate.

In this embodiment of the present invention, the sending network element may determine a quantity of CCEGs included in a control channel candidate, a quantity of CCEs included in each CCEG, a quantity of measurement reference signals, and a time-frequency resource corresponding to each measurement reference signal, and add DCI to one or more CCEGs included in the control channel candidate, where the DCI includes the quantity of measurement reference signals. After a receiving network element obtains the DCI through blind detection and learns, based on the DCI, of the quantity of measurement reference signals and the time-frequency resource corresponding to each measurement reference signal, the receiving network element may calculate channel quality information corresponding to each measurement reference signal and report the channel quality information to the sending network element, so that the sending network element can determine channel quality information corresponding to all measurement reference signals. This improves measurement accuracy.

Figure 9:
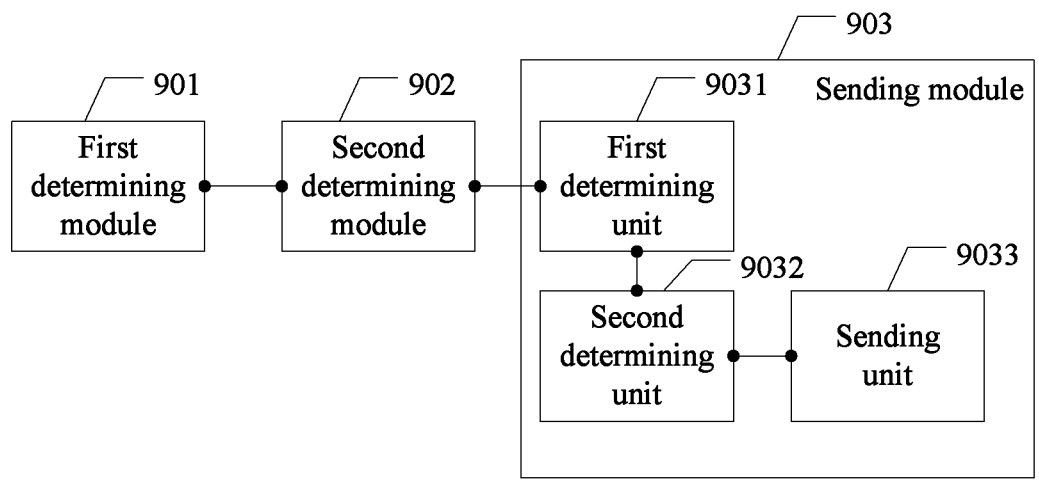
FIG. 9 is a schematic diagram of another embodiment of a sending network element according to the embodiments of the present invention.

For ease of understanding, the following describes in detail the sending network element in the embodiments of the present invention. Referring to FIG. 9, another embodiment of the sending network element in the embodiments of the present invention includes:

a first determining module 901, configured to determine one or more control channel element groups CCEGs of a first target control channel candidate in a target control channel candidate set, where each CCEG includes one or more CCEs;

a second determining module 902, configured to determine target downlink control information DCI carried on the first target control channel candidate, where the target DCI includes information about a quantity of measurement reference signals and information about a time-frequency resource corresponding to each measurement reference signal, and the measurement reference signal includes a demodulation reference signal of the first target control channel candidate and/or a demodulation reference signal of at least one second target control channel candidate in the target control channel candidate set; and a sending module 903, configured to send the target DCI by using the one or more CCEGs of the first target control channel candidate.

The sending module 903 includes:

a first determining unit 9031, configured to determine a modulation and coding scheme corresponding to each CCEG of the first target control channel candidate;

a second determining unit 9032, configured to modulate and code, by using the modulation and coding scheme, target DCI carried in each CCEG; and a sending unit 9033, configured to send the modulated and coded target DCI by using a corresponding CCEG.

In this embodiment of the present invention, the sending network element may determine a quantity of CCEGs included in a control channel candidate, a quantity of CCEs included in each CCEG, a quantity of measurement reference signals, and a time-frequency resource corresponding to each measurement reference signal, and add DCI to one or more CCEGs included in the control channel candidate, where the DCI includes the quantity of measurement reference signals. After a receiving network element obtains the DCI through blind detection and learns, based on the DCI, of the quantity of measurement reference signals and the time-frequency resource corresponding to each measurement reference signal, the receiving network element may calculate channel quality information corresponding to each measurement reference signal and report the channel quality information to the sending network element, so that the sending network element can determine channel quality information corresponding to all measurement reference signals. This improves measurement accuracy.

Besides, this embodiment of the present invention provides a specific manner of sending the target DCI by the sending module 903, thereby improving implementability of the solution.

The receiving network element in the embodiments of the present invention may be one or more terminals. The terminal may be any terminal device including a mobile phone, a tablet computer, a personal digital assistant (PDA for short), a point of sale (POS for short), an in-vehicle computer, or the like. An example in which the terminal is a mobile phone is used.

Figure 10:
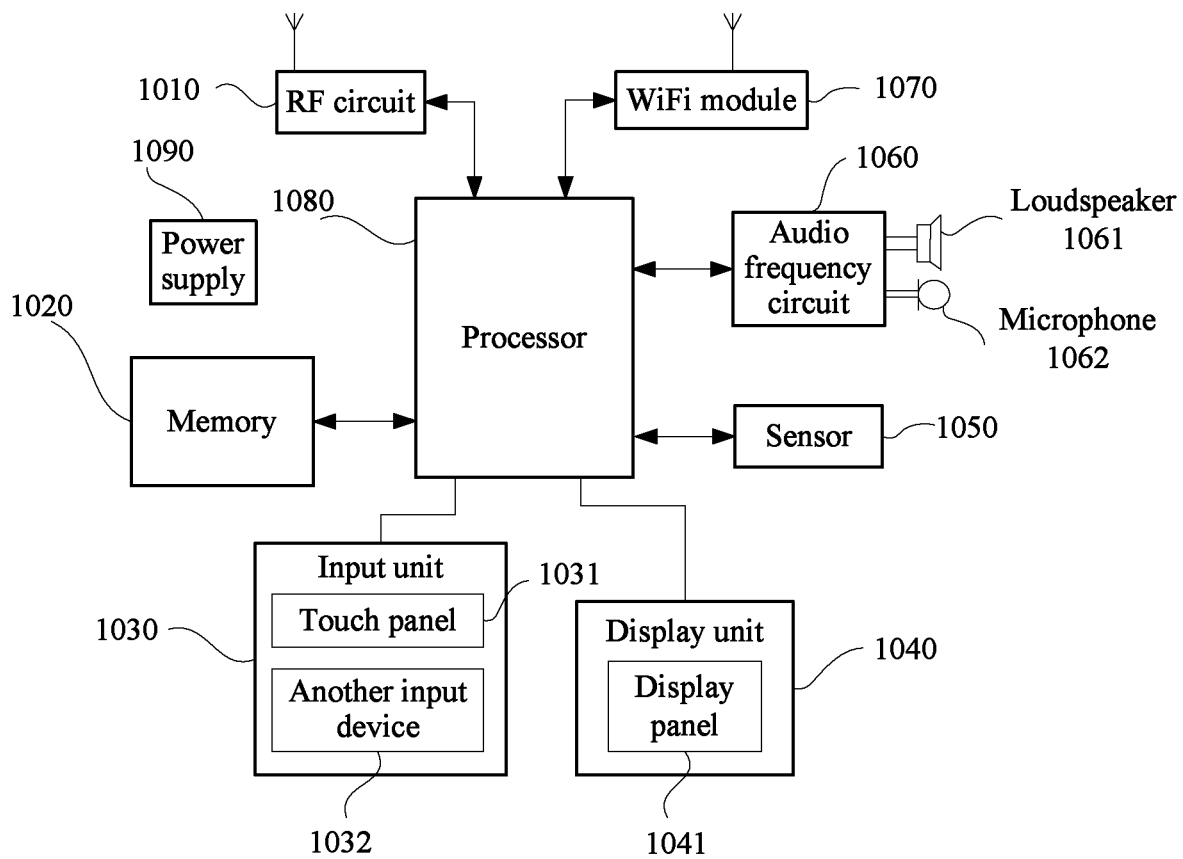
FIG. 10 is a schematic diagram of an embodiment of a terminal according to the embodiments of the present invention.

FIG. 10 is a block diagram of a partial structure of a mobile phone related to a terminal according to an embodiment of the present invention. Referring to FIG. 10, the mobile phone includes components such as a radio frequency (RF for short) circuit 1010, a memory 1020, an input unit 1030, a display unit 1040, a sensor 1050, an audio frequency circuit 1060, a wireless fidelity (WiFi for short) module 1070, a processor 1080, and a power supply 1090. Persons skilled in the art can understand that the structure of the mobile phone shown in FIG. 10 does not constitute any limitation on the mobile phone, and the mobile phone may include more or fewer components than those shown in the figure, or a combination of some components, or components disposed differently.

Constituent components of the mobile phone are specifically described with reference to FIG. 10 in the following.

The RF circuit 1010 may be configured to receive or send a signal during information reception/sending or a call. In particular, the RF circuit 1010 receives downlink information of a base station, and sends the downlink information to the processor 1080 for processing; and in addition, sends related uplink data to the base station. The RF circuit 1010 usually includes but is not limited to an antenna, at least one amplifier, a transceiver, a coupler, a low noise amplifier (LNA for short), or a duplexer. In addition, the RF circuit 1010 may also communicate with a network and another device through wireless communication. For the wireless communication, any communications standard or protocol may be used, including but not limited to Global System for Mobile Communications (GSM for short), General Packet Radio Service (GPRS), Code Division Multiple Access (CDMA for short), Wideband Code Division Multiple Access (WCDMA for short), Long Term Evolution (LTE for short), email, or short message service (SMS).

The memory 1020 may be configured to store a software program and a module. The processor 1080 executes various function applications of the mobile phone and processes data, by running the software program and the module stored in the memory 1020. The memory 1020 may mainly include a program storage area and a data storage area. The program storage area may store an operating system, an application required for at least one function (such as a sound playback function and an image playback function), and the like. The data storage area may store data (such as audio data and a phone book) created according to use of the mobile phone, and the like. In addition, the memory 1020 may be a high-speed random access memory, or may be a non-volatile memory such as at least one magnetic disk memory device, or a flash memory device.

The input unit 1030 may be configured to receive entered digital or character information, and generate key signal input related to a user setting and function control of the mobile phone. Specifically, the input unit 1030 may include a touch panel 1031 and another input device 1032. The touch panel 1031, also referred to as a touchscreen, may collect a touch operation performed by a user on or near the touch panel 1031 (for example, an operation performed on or near the touch panel 1031 by the user by using a finger, a stylus, or any other suitable object or accessory), and drive a corresponding connection apparatus according to a preset program. Optionally, the touch panel 1031 may include two components: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into contact coordinates, and sends the contact coordinates to the processor 1080, and can receive a command sent by the processor 1080 and execute the command. In addition, the touch panel 1031 may be implemented in a plurality of types such as a resistive type, a capacitive type, an infrared type, and a surface acoustic wave type. In addition to the touch panel 1031, the input unit 1030 may further include the another input device 1032. Specifically, the another input device 1032 may include but is not limited to one or more of a physical keyboard, a function key (such as a volume control key or an on/off key), a trackball, a mouse, and a joystick.

The display unit 1040 may be configured to display information entered by the user, information provided for the user, and various menus of the mobile phone. The display unit 1040 may include a display panel 1041. Optionally, the display panel 1041 may be configured in a form of a liquid crystal display (LCD for short), an organic light-emitting diode (OLED for short), or the like. Further, the touch panel 1031 may cover the display panel 1041. After detecting a touch operation on or near the touch panel 1031, the touch panel 1031 sends the touch operation to the processor 1080 to determine a touch event type. Then, the processor 1080 provides corresponding visual output on the display panel 1041 based on the touch event type. Although in FIG. 10, the touch panel 1031 and the display panel 1041 are used as two separate components to implement input and output functions of the mobile phone, in some embodiments, the touch panel 1031 may be integrated with the display panel 1041 to implement the input and output functions of the mobile phone.

The mobile phone may further include at least one sensor 1050 such as a light sensor, a motion sensor, or another sensor. Specifically, the light sensor may include an ambient light sensor and a proximity sensor. The ambient light sensor may adjust luminance of the display panel 1041 based on brightness of ambient light. The proximity sensor may turn off the display panel 1041 and/or backlight when the mobile phone is moved to an ear. As a type of motion sensor, an accelerometer sensor can detect a value of an acceleration in all directions (there are usually three axes), can detect a value and a direction of gravity when the mobile phone is still, and can be used for application of mobile phone posture identification (such as switch between landscape and portrait modes, a related game, and magnetometer posture calibration), for a vibration-recognition related function (such as a pedometer and a knock), and the like. For a gyroscope, a barometer, a hygrometer, a thermometer, an infrared sensor, and another sensor that can be configured in the mobile phone, details are not described herein.

The audio frequency circuit 1060, a loudspeaker 1061, and a microphone 1062 can provide an audio interface between the user and the mobile phone. The audio frequency circuit 1060 may transmit, to the loudspeaker 1061, an electric signal converted from received audio data, and the loudspeaker 1061 converts the electric signal into a sound signal for output. On the other hand, the microphone 1062 converts a collected sound signal into an electric signal; the audio frequency circuit 1060 receives the electric signal and converts the electric signal into audio data, and outputs the audio data to the processor 1080 for processing; and the processed audio data is sent to, for example, another mobile phone, by using the RF circuit 1010, or the audio data is output to the memory 1020 for further processing.

WiFi belongs to a short-range wireless transmission technology. The mobile phone can help, by using the WiFi module 1070, the user receive and send an email, browse a web page, access streaming media, and the like. The WiFi module 1070 provides the user with wireless broadband access to the Internet. Although FIG. 10 shows the WiFi module 1070, it can be understood that the WiFi module 1170 is not a necessary constituent of the mobile phone and may be omitted as required provided that the scope of the essence of the present invention is not changed.

The processor 1080 is a control center of the mobile phone, and connects various components of the entire mobile phone by using various interfaces and lines. The processor 1080 executes various functions of the mobile phone and processes data, by running or executing the software program and/or the module stored in the memory 1020 and invoking data stored in the memory 1020, to monitor the entire mobile phone. Optionally, the processor 1080 may include one or more processing units. Preferably, an application processor and a modem processor may be integrated into the processor 1080. The application processor mainly processes an operating system, a user interface, an application, and the like. The modem processor mainly processes radio communication. It can be understood that the modem processor may alternatively not be integrated into the processor 1080.

The mobile phone further includes the power supply 1090 (for example, a battery) that supplies power to various components. Preferably, the power supply may be logically connected to the processor 1080 by using a power management system, to implement functions such as charge management, discharge management, and power consumption management by using the power management system.

Although not shown, the mobile phone may further include a camera, a Bluetooth module, and the like, and details are not described herein.

In this embodiment of the present invention, the processor 1080 included in the terminal further includes the following functions:

obtaining target DCI on a first target control channel candidate in a target control channel candidate set, where the target DCI is DCI of the terminal, the first target control channel candidate includes one or more CCEGs, and the target DCI is carried in the one or more CCEGs of the target control channel; parsing content in the target DCI after obtaining the target DCI, and determining a quantity of target measurement reference signals and a time-frequency resource corresponding to each measurement reference signal; measuring each measurement reference signal, to obtain channel quality information corresponding to each measurement reference signal; and reporting the channel quality information to the sending network element, where the measurement reference signal includes a demodulation reference signal of the first target control channel candidate and/or a demodulation reference signal of at least one second target control channel candidate in the target control channel candidate set, and the second target control channel candidate is different from the first target control channel candidate.

Optionally, in this embodiment of the present invention, the processor 1080 can further perform the following step: determining a demodulation reference signal of one or more CCEGs corresponding to each measurement reference signal.

Optionally, in this embodiment of the present invention, the processor 1080 can further perform the following step: determining a CCEG included in the first target control channel candidate, and after determining a quantity of CCEGs in the first target control channel candidate and a quantity of CCEs included in each CCEG, determining, based on the quantity of CCEGs, the quantity of CCEs, and the quantity of measurement reference signals, the demodulation reference signal corresponding to each measurement reference signal.

Figure 11:
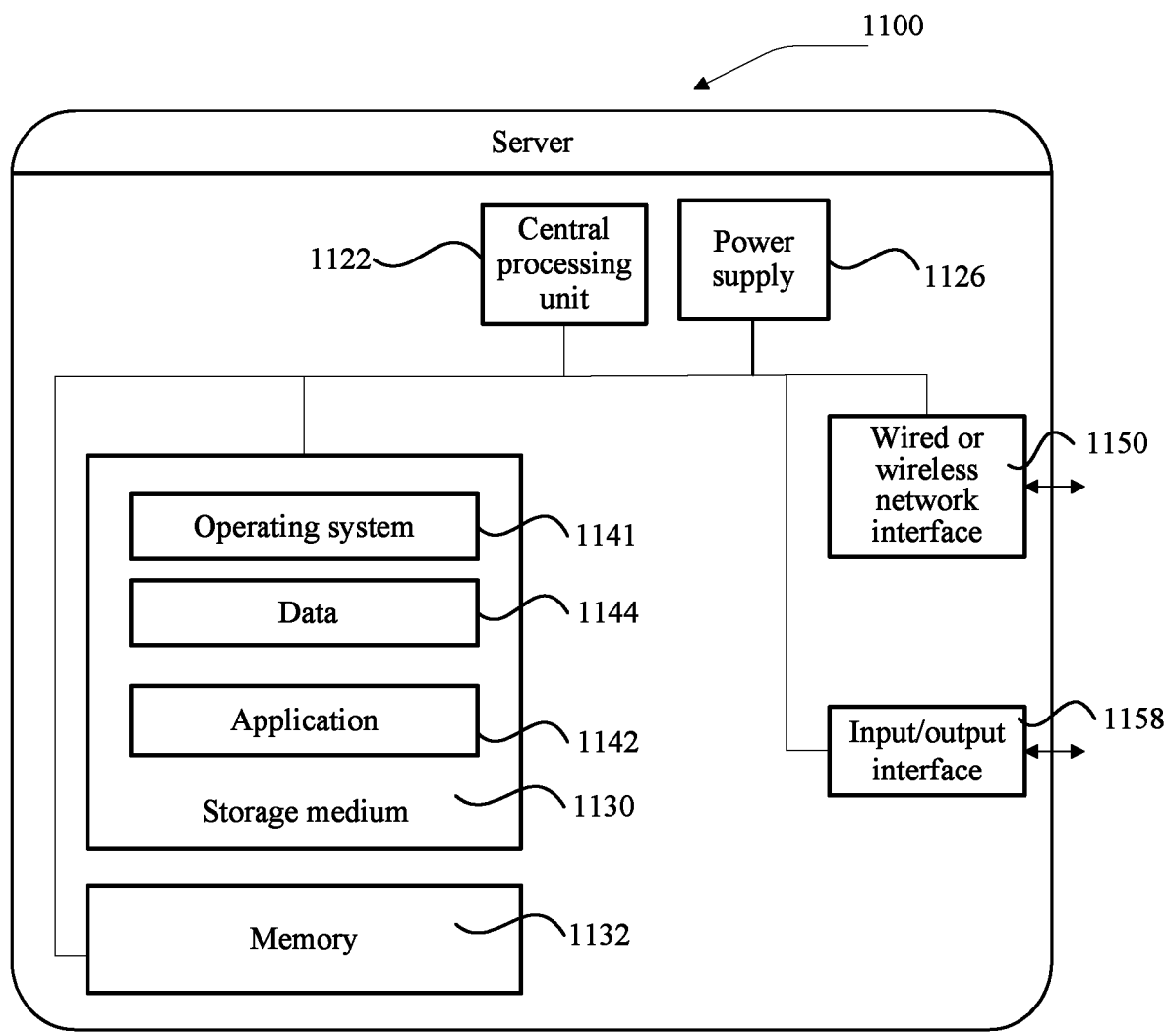
FIG. 11 is a schematic diagram of an embodiment of a server according to the embodiments of the present invention.

FIG. 11 is a schematic structural diagram of a server 1100 according to an embodiment of the present invention. The server 1100 may greatly differ due to a different configuration or different performance, and may be a base station, a transceiver site, or another network element. The server 1100 may include one or more central processing units (CPU) 1122 (for example, one or more processors), a memory 1132, and one or more storage media 1130 (for example, one or more massive-capacity storage devices) that store an application 1142 or data 1144. The memory 1132 and the storage medium 1130 may be used for temporary storage or permanent storage. A program stored in the storage medium 1130 may include one or more modules (not shown in the figure), and each module may include a series of instruction operations performed on the server. Further, the central processing unit 1122 may be set to communicate with the storage medium 1130, and executes, on the server 1100, the series of instruction operations in the storage medium 1130.

The server 1100 may further include one or more power supplies 1126, one or more wired or wireless network interfaces 1150, one or more input/output interfaces 1158, and/or one or more operating systems 1141, for example, Windows Server™, Mac OS X™, Unix™, Linux™, and FreeBSD™.

The central processing unit 1122 specifically performs the following steps:

determining one or more control channel element groups CCEGs of a first target control channel candidate in a target control channel candidate set, where each CCEG includes one or more CCEs; determining target downlink control information DCI carried on the first target control channel candidate, where the target DCI includes information about a quantity of measurement reference signals and information about a time-frequency resource corresponding to each measurement reference signal, and the measurement reference signal includes a demodulation reference signal of the first target control channel candidate and/or a demodulation reference signal of at least one second target control channel candidate in the target control channel candidate set; and sending the target DCI by using the one or more CCEGs of the first target control channel candidate.

Optionally, the information about the time-frequency resource corresponding to each measurement reference signal includes a demodulation reference signal of one or more CCEGs corresponding to each measurement reference signal.

Optionally, each measurement reference signal is corresponding to a different precoding matrix.

Optionally, a CCEG corresponding to at least one of the measurement reference signals includes at least the CCEG of the first target control channel candidate.

Optionally, the central processing unit 1122 further specifically performs the following steps:

determining a modulation and coding scheme corresponding to each CCEG of the first target control channel candidate; modulating and coding, by using the modulation and coding scheme, target DCI carried in each CCEG; and sending the modulated and coded target DCI by using a corresponding CCEG.

It may be clearly understood by persons skilled in the art that, for the purpose of convenient and brief description, for a specific working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate components may or may not be physically separate, and components displayed as units may or may not be physical units, may be located in one position, or may be distributed to a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (ROM for short), a random access memory (RAM for short), a magnetic disk, or an optical disc.

The foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A downlink control channel transmission method comprising:
   receiving, by a receiving network element, a first target control channel candidate and a second target control channel candidate corresponding to the first target control channel candidate, wherein downlink control information carried by the first target candidate control channel and downlink control information carried by the second target control channel candidate are the same; and
   receiving, by the receiving network element, downlink data according to the downlink control information;
   wherein channel coding of the first target control channel candidate and channel coding of the second target control channel candidate are the same, modulation of the first target control channel candidate and modulation of the second target control channel candidate are the same,
   wherein a time-frequency resource of the first target control channel candidate and a time-frequency resource of the second target control channel candidate are related,
   wherein the time-frequency resource of the first target control channel candidate is determined based on the time-frequency resource of the second target control channel candidate, or the time-frequency resource of the second target control channel candidate is determined based on the time-frequency resource of the first target control channel candidate, and
   wherein a demodulation reference signal of the first target control channel candidate and a demodulation reference signal of the second target control channel candidate correspond to different antenna ports.

2. The method according to claim 1, wherein a quantity of control channel elements (CCEs) included in the first target control channel candidate and a quantity of CCEs included in the second target control channel candidate are the same.

3. The method according to claim 1, wherein
   the first target control channel candidate and the second target control channel candidate are from different sending network elements.

4. The method according to claim 1, wherein
   a precoding matrix of a demodulation reference signal of the first target candidate control channel is different from a precoding matrix of a demodulation reference signal of the second target control channel.

5. A downlink control channel transmission method comprising:
   sending, by a first sending network element, a first target control channel candidate; and
   sending, by a second sending network element, a second target control channel candidate corresponding to the first target control channel candidate, wherein downlink control information carried by the first target control channel candidate and downlink control information carried by the second target control channel candidate are the same;
   wherein channel coding of the first target control channel candidate and channel coding of the second target control channel candidate are the same, modulation of the first target control channel candidate and modulation of the second target control channel candidate are the same,
   wherein a time-frequency resource of the first target control channel candidate and a time-frequency resource of the second target control channel candidate are related, and the time-frequency resource of the first target control channel candidate is determined based on the time-frequency resource of the second target control channel candidate, or the time-frequency resource of the second target control channel candidate is determined based on the time-frequency resource of the first target control channel candidate, and
   wherein a demodulation reference signal of the first target control channel candidate and a demodulation reference signal of the second target control channel candidate correspond to different antenna ports.

6. The method according to claim 5, wherein
   a quantity of control channel elements (CCEs) included in the first target control channel candidate is the same as a quantity of CCEs included in the second target control channel candidate.

7. The method according to claim 5, wherein
   a precoding matrix of a demodulation reference signal of the first target control channel candidate is different from a precoding matrix of a demodulation reference signal of the second target control channel candidate.

8. A communications device, comprising:
   a processor; and
   a memory storing instructions that when executed by the processor configure the communications device to perform steps comprising:
   receiving a first target control channel candidate and a second target control channel candidate corresponding to the first target control channel candidate, wherein downlink control information carried by the first target control channel candidate and downlink control information carried by the second target control channel candidate are the same; and receiving downlink data according to the downlink control information;

wherein channel coding of the first target control channel candidate and channel coding of the second target control channel candidate are the same, modulation of the first target control channel candidate and modulation of the second target control channel candidate are the same, wherein a time-frequency resource of the first target control channel candidate and a time-frequency resource of the second target control channel candidate are related, wherein the time-frequency resource of the first target control channel candidate is determined based on the time-frequency resource of the second target control channel candidate, or the time-frequency resource of the second target control channel candidate is determined based on the time-frequency resource of the first target control channel candidate, and wherein a demodulation reference signal of the first target control channel candidate and a demodulation reference signal of the second target control channel candidate correspond to different antenna ports.

9. The communications device according to claim 8, wherein
a quantity of control channel elements (CCEs) included in the first target control channel candidate and a quantity of CCEs included in the second target control channel candidate are the same.

10. The communications device according to claim 8, wherein
the first target control channel candidate and the second target control channel candidate are from different sending network elements.

11. The communications device according to claim 8, wherein
a precoding matrix of a demodulation reference signal of the first target control channel candidate is different from a precoding matrix of a demodulation reference signal of the second target control channel candidate.

12. A communication system, comprising at least one first sending network element and at least one second sending network element, wherein when working in the communication system, the first sending network element and the second sending network element are configured to perform a method that comprises:

sending, by the first sending network element, a first target control channel candidate;

sending, by the second sending network element, a second target control channel candidate corresponding to the first target control channel candidate, wherein downlink control information carried by the first target control channel candidate and downlink control information carried by the second target control channel candidate are the same; and wherein channel coding of the first target control channel candidate and channel coding of the second target control channel candidate are the same, modulation of the first target control channel candidate and modulation of the second target control channel candidate are the same, wherein a time-frequency resource of the first target control channel candidate and a time-frequency resource of the second target control channel candidate are related, and the time-frequency resource of the first target control channel candidate is determined based on the time-frequency resource of the second target control channel candidate, or the time-frequency resource of the second target control channel candidate is determined based on the time-frequency resource of the first target control channel candidate, and wherein a demodulation reference signal of the first target control channel candidate and a demodulation reference signal of the second target control channel candidate correspond to different antenna ports.

13. The communication system according to claim 12, wherein
a quantity of control channel elements (CCEs) included in the first target control channel candidate and a quantity of CCEs included in the second target control channel candidate are the same.

14. The communication system according to claim 12, wherein
a precoding matrix of a demodulation reference signal of the first target control channel candidate is different from a precoding matrix of a demodulation reference signal of the second target control channel candidate.

* * * * *